(12) United States Patent
Sullivan

(10) Patent No.: US 7,256,991 B2
(45) Date of Patent: Aug. 14, 2007

(54) NON-PERIPHERALS PROCESSING CONTROL MODULE HAVING IMPROVED HEAT DISSIPATING PROPERTIES

(76) Inventor: Jason A. Sullivan, 241 Mansell Dr., Youngstown, OH (US) 44505

( * ) Notice: Subject to any disclaimer, the term of this patent is extended or adjusted under 35 U.S.C. 154(b) by 75 days.

(21) Appl. No.: 10/691,473

(22) Filed: Oct. 22, 2003

(65) Prior Publication Data

US 2004/0150959 A1 Aug. 5, 2004

Related U.S. Application Data

(60) Provisional application No. 60/455,789, filed on Mar. 19, 2003, provisional application No. 60/420,127, filed on Oct. 22, 2002.

(51) Int. Cl.
*H05K 7/00* (2006.01)
(52) U.S. Cl. .................. 361/687; 361/728; 345/800; 710/304
(58) Field of Classification Search ........ 361/679–682, 361/685–687, 724–728; 395/800; 364/200; 710/101–102, 129, 305, 304; 712/36; 700/215
See application file for complete search history.

(56) References Cited

U.S. PATENT DOCUMENTS

| | | | |
|---|---|---|---|
| 3,787,818 A | 1/1974 | Arnold et al. ............ 340/172.5 |
| 4,232,356 A | 11/1980 | Saunders et al. ............ 361/415 |
| 4,814,970 A | 3/1989 | Barbagelata et al. ........ 364/200 |
| 4,816,993 A | 3/1989 | Takahashi et al. .......... 364/200 |
| 4,876,644 A | 10/1989 | Nuechterlein et al. ...... 364/200 |
| 5,136,718 A | 8/1992 | Haydt .......................... 395/800 |
| 5,227,957 A | 7/1993 | Deters .......................... 361/395 |
| 5,311,397 A | 5/1994 | Harshberger et al. ....... 361/683 |
| 5,377,356 A | 12/1994 | Molyneaux ................. 395/800 |
| 5,504,918 A | 4/1996 | Collette et al. ............. 395/800 |
| 5,539,616 A | 7/1996 | Kikinis ........................ 361/686 |
| 5,602,721 A | 2/1997 | Slade et al. .................. 361/727 |
| 5,671,430 A | 9/1997 | Gunzinger ................... 395/800 |
| 5,689,406 A | 11/1997 | Wood et al. ................. 361/796 |
| 5,696,983 A | 12/1997 | Watanabe et al. ........... 395/800 |
| 5,761,033 A | 6/1998 | Wilhelm ...................... 361/686 |
| 5,805,474 A | 9/1998 | Danielson et al. ........ 364/708.1 |
| 5,863,211 A | 1/1999 | Sobotta et al. ................ 439/74 |
| 5,909,357 A | 6/1999 | Orr .............................. 361/687 |
| 5,938,757 A | 8/1999 | Bertsch ......................... 712/36 |
| 5,948,087 A | 9/1999 | Khan et al. .................. 710/102 |
| 5,999,952 A | 12/1999 | Jenkins et al. .............. 708/100 |
| 6,021,453 A | 2/2000 | Klingman .................... 710/129 |
| 6,035,356 A | 3/2000 | Khan et al. .................. 710/101 |
| 6,049,449 A | 4/2000 | Cranston, III et al. ....... 361/683 |
| 6,157,533 A | 12/2000 | Sallam et al. ................ 361/683 |
| 6,157,537 A | 12/2000 | Cheng ......................... 361/699 |
| 6,229,710 B1 | 5/2001 | Chen ........................... 361/759 |

(Continued)

*Primary Examiner*—Hung Van Duong
(74) *Attorney, Agent, or Firm*—David B. Tingey; Kirton & McConkie

(57) ABSTRACT

The present invention features a non-peripherals-based processing control unit having an encasement module that is very small and durable compared to conventional computer encasement structures. The process control unit is capable of being incorporated into various devices and/or environments, of accepting applied and impact loads, of functioning as a load bearing structure, as well as being able to be processed coupled together with one or more processing control units to provide scaled processing power. The processing control unit of the present invention further features a unique method of cooling using natural convection, as well as utilizing known cooling means, such as liquid or thermoelectric cooling.

66 Claims, 14 Drawing Sheets

U.S. PATENT DOCUMENTS

| | | |
|---|---|---|
| 6,246,573 B1 | 6/2001 | Khan et al. .................. 361/683 |
| 6,275,922 B1 | 8/2001 | Bertsch ....................... 712/36 |
| 6,288,893 B1 | 9/2001 | Faranda et al. ............. 361/683 |
| 6,304,459 B1 | 10/2001 | Toyosato et al. ........... 361/861 |
| 6,307,742 B1 | 10/2001 | Diaz et al. .................. 361/683 |
| 6,327,152 B1 | 12/2001 | Saye .......................... 361/732 |
| 6,351,375 B1 | 2/2002 | Hsieh et al. ................ 361/685 |
| 6,377,446 B1 | 4/2002 | Liau ........................... 361/683 |
| 6,446,192 B1 | 9/2002 | Narasimhan et al. ......... 712/29 |
| 6,463,519 B1 | 10/2002 | Yoshida et al. ............... 712/28 |
| 6,467,009 B1 | 10/2002 | Winegarden et al. ....... 710/305 |
| 6,490,157 B2 | 12/2002 | Unrein ....................... 361/687 |
| 6,512,963 B1* | 1/2003 | Felde et al. ................. 700/215 |
| 6,532,152 B1 | 3/2003 | White et al. ................ 361/692 |
| 6,574,098 B2* | 6/2003 | Netzel et al. ............... 361/683 |
| 6,629,181 B1* | 9/2003 | Alappat et al. ............. 710/300 |
| 6,819,550 B2 | 11/2004 | Jobs et al. .................. 361/683 |
| 2001/0048793 A1 | 12/2001 | Dair et al. .................... 385/92 |
| 2002/0097555 A1* | 7/2002 | Smith et al. ................ 361/683 |
| 2003/0005073 A1 | 1/2003 | Yoshizawa et al. ......... 709/213 |
| 2003/0090878 A1 | 5/2003 | Merkin ....................... 361/724 |
| 2003/0156383 A1 | 8/2003 | Jenkins et al. .............. 361/683 |
| 2004/0268005 A1 | 12/2004 | Dickie ........................ 710/303 |

\* cited by examiner

NON-PERIPHERALS PROCESSING CONTROL MODULE HAVING IMPROVED HEAT DISSIPATING PROPERTIES

RELATED APPLICATIONS

This application claims priority to U.S. Provisional Application Ser. No. 60/420,127, filed Oct. 22, 2002, and entitled, "Non-Peripherals Processing Control Unit Having Improved Heat Dissipating Properties." This application also claims priority to U.S. Provisional Application Ser. No. 60/455,789, filed Mar. 19, 2003, and entitled, "System And Method For Providing A Durable And Dynamically Modular Processing Unit," each of which are incorporated by reference herein in their entirety.

This application further relates to copending U.S. patent application Ser. No. 10/692,005, filed Oct. 22, 2003, entitled, "Robust Customizable Computer Processing System," and to U.S. patent application Ser. No. 10/619,114, filed Oct. 22, 2003, entitled "System and Methods for Providing a Dynamically Modular Processing Unit," each of which are incorporated by reference herein in their entirety.

BACKGROUND AND RELATED ARTS

1. Field of the Invention

The present invention relates to computer processors and processing systems, computer housings, and computer encasement modules. In particular, the present invention relates to a non-peripheral-based computer processor and processing system configured within a proprietary encasement module and having a proprietary electrical printed circuit board configuration and other electrical components existing in a proprietary design. Still further, the present invention relates to heat dissipating and/or cooling means for computer encasement modules, and particularity to a passive thermodynamic cooling system for dissipating heat from and cooling the interior of a computer encasement module.

2. Background of the Invention

As one of the most influential technologies in either the modern or historical world, computers and computer systems have significantly altered the way we conduct and live our lives, and have accelerated technological advancement to an exponential growth pace. Indeed, computers and computing systems play an indispensable role in driving invention, enabling lightning speed technological advancement, simplifying tasks, recording and storing data, connecting the world, as well as numerous other applications in virtually every industry and every country around the world. Indeed, the computer has become an indispensable tool for both individuals, businesses, and governments alike. Since its inception, the computer and computing systems have undergone significant evolutionary changes. The small, powerful modern systems in use today are virtually incomparable to their ancestral counterparts of yesteryear.

Although the evolution of the processing capabilities of computers and computing systems reveals an exponential growth pattern, the physical and structural characteristics of these systems, namely the cases or encasement modules housing such electrical components as the processing (printed circuit boards, mother boards, etc.) and the peripheral components (hard drives, CD/DVD-ROM drives, sound cards, video cards, etc.) has unfortunately been limited to marginal improvement, with design considerations dictated by needed functionality, workability, and various component inclusion and associated design constraints. Computers and computing systems of today have not been able to shed the large, bulky encasement modules that support the processing and other components.

Conventional computer systems and their encasement modules, namely desktops, servers, and other similar computers or computing systems, while very functional and very useful, are large and bulky due to several reasons, one being that they are designed to comprise all of the components and peripheral devices necessary to operate the computer system, except the various external devices such as a monitor, a keyboard, a mouse, and the like. Indeed, partly to blame for the proliferation and slow evolution of the large and bulky computer encasement module is the perceived convenience of bundling both processing components and peripheral components within a neat, easy-to-use, single package. Such encasement modules have a rather large footprint, are heavy, and do not lend themselves to mobility or environmental adaptability. However, little has been done to move away from this and such systems are commonplace and accepted. For example, server systems are typically found within some type of area or space or room specifically designed to house the box-like structure; desktop computers occupy a significant amount of space of workstations, with their presence sometimes concealed within desks; or, some computers are left out in the open because there is nowhere else to place them.

While obviously there are a significant number of advantages and benefits, there are several problems or flaws, both inherent and created, associated with conventional computers and computing systems and the encasement modules comprising such. First, they are aesthetically displeasing as they take up space, require multiple cords, and generally look out of place with furniture and other decor. Second, they are noisy and produce or radiate large amounts of heat when in operation as generated from the processing and peripheral components contained therein. Third, they provide fertile ground for dust, debris, insects, and various other foreign objects. Forth, they are difficult to keep clean, particularly the internal components. Fifth, they produce a great deal of radiation in the form of electromagnetic interference. Sixth, they do not lend themselves to environmental or situational adaptability, meaning they are one-dimensional in function, namely to perform only computing functions. Seventh, they are not easily scalable, meaning that it is difficult to couple multiple computers together to achieve increased processing capabilities, especially without ample space or real estate. Eighth, the size and number of existing components require forced cooling systems, such as one or multiple fans, to dissipate heat from the interior of the system. Ninth, they comprise a peripheral-based system that requires all the peripherals to be operable simultaneously without giving the user the ability to interchange any one peripheral or all of the peripherals as desired. Tenth, while some peripheral devices may be interchangeable, some are not. These peripherals, such as the hard drive, are permanent, fixed structures.

Another significant disadvantage with conventional computers and computing systems is their inability to be easily adaptable to various environments or placed into existing systems, devices, etc. to enable a "smart" system. Conventional computers sit on the floor or in a desk and operate in a limited manner. In addition, conventional computers are not designed to be integrated within or as part of a structure or device to introduce intelligence into the structure or device. Still further, conventional computers do not possess any significant load bearing capabilities that allow them to serve as support members.

Lastly, the means for dissipating heat or means for cooling the components of conventional computers and computing systems presents several disadvantages. In almost all cases, heat dissipation or cooling is achieved by some type of forced cooling system. This typically means placing or mounting one or more blowers or fans within the interior and providing means for ventilating the circulated air, such as by forming slits within the walls of the encasement module. Indeed, most of the computer encasements currently in existence require the use of a forced cooling system to dissipate heat and to cool the interior of the computer where the processing components are located to preserve or maintain acceptable temperatures for component operation. Moreover, as most of the peripheral devices used are found within the interior, the encasement modules tend to be rather large, having a relatively large interior volume of space. As a result, the thermal discharge from the processing components is essentially trapped within this volume of space because there is no way for the air to escape. Therefore, various mechanical devices, such as blowers or fans, are incorporated into conventional encasement modules to circulate the air and dissipate heat from the interior to the outside air, which causes undesirable increase in temperature in the room where the computer is located.

Accordingly, there is a need for a computer system and a computer encasement that is capable of broadening the adaptability, usability, and functionality of prior related computer systems and encasements.

SUMMARY AND OBJECTS OF THE INVENTION

In accordance with the invention as embodied and broadly described herein, the present invention features an encasement for a computer processing control unit comprising (a) a main support chassis having a plurality of wall supports and a plurality of junction centers containing means for supporting a computer component therein; (b) a dynamic back plane that provides support for connecting peripheral and other computing components; and (c) means for cooling said encasement.

The present invention also features a unique computer processing system, and specifically a proprietary non-peripherals processing control unit, having unique heat dissipating capabilities. In a preferred embodiment, the proprietary processing control unit comprises: (a) an encasement module comprising: a main support chassis having a plurality of wall supports and a plurality of junction centers containing means for supporting a computer component therein; a dynamic back plane that provides support for connecting peripheral and other computing components directly to a system bus without requiring an interface; and means for enclosing the main support chassis and providing access to an interior portion of the encasement module; (b) one or more computer processing components removably supported within the junction centers of the encasement module; and (c) means for cooling the interior portion of the encasement module In a preferred embodiment, the proprietary non-peripherals computer processing system, and particularly encasement module, is substantially cube shaped to provide strength and durability to the processing control unit. In addition, the encasement module preferably comprises an aluminum metal composition to allow the case to further conduct heat, to allow the case to be electrically charged if needed, and to reduce the electromagnetic interference of radiation given off by the processing control unit.

Also in a preferred embodiment, the encasement module comprises a main support chassis having first, second and third side wall supports; first and second end plates removably coupled to the main support chassis, wherein the end plates each comprise a plurality of ventilation ports; a dynamic back plane also removably coupled to the main support chassis; and a layered (e.g., tri-board) electrical printed circuit board configuration removably secured within the encasement module. The encasement module also comprises first, second, and third insert members that removably couple to said wall supports, respectively, wherein the insert members provide both functional and aesthetic capabilities to the processing control unit.

One significant feature of the processing control unit is its small, non-peripheral-based design. Such a design allows the processing control unit to be able to perform many functions prior related computer systems cannot. For instance, it may be used as a load bearing structure due to its own structural design and material composition, or it may be used to support various peripheral items, such as a computer screen attached directly to the encasement module, or it may accept impact loads, or it may be used in extreme environments, etc. The encasement module housing the processing control components may be placed within a structure and may contribute to the overall stability and strength of the structure by bearing weight through its chassis design. The processing control unit also has the ability to take on the attributes and characteristics of a super structure, wherein the processing control unit is placed within a host structure and allowed to take on the physical attributes of the structure. Allowing systems of the present invention to take on super structures allows the product to be utilized in a unique way in other industries and/or environments. Again, this is primarily made possible through the physical attributes of the processing control unit. Although impossible to recite herein, what is intended by the present invention is that the processing control unit function as a processing unit without all of the peripheral items commonly found in computers. In addition, it is intended that the processing control unit be adaptable for use within any conceivable environment, whether harsh or not. Finally, but not all inclusive, it is intended that the processing control unit provide an increased aesthetically and functional computing system for homes, businesses, and other seminal workstations alike.

In a similar concept, the processing control unit contemplates taking on various sizes and/or geometric shapes to accommodate particular structures or environments.

The processing control unit also may be used as an acceptable omni and directional antenna for wireless networking standards, such as 802.11a and 802.11b, as well as other wireless standards, such as blue tooth.

As stated, the present invention further features a system and method for cooling the processing control unit and dissipating heat therefrom. Preferably, means for cooling and/or dissipating heat comprises a method and system for using natural convection to cool the interior portion and the processing components of the processing control unit. According to one exemplary embodiment of the present invention, the encasement module, and particularly the main support chassis, comprises a series of concave wall supports. These concave wall supports provide a physical path for heated air to follow, as well as providing one exemplary way to naturally compress the heated air causing it to increase in velocity and to facilitate the dissipation of the heated air from the processing control unit.

In operation, as the processing control unit is powered on, the various computer components contained therein begin to generate and radiate heat (i.e., thermal discharge). The air proximate the computer components is subsequently heated as a result of the natural radiation of the thermal discharge. This heated air naturally tends to rise to the surface. However, as they the heated air travels upwards towards the top of the encasement module, its velocity is increased as it encounters a constricted space or gap created by the positioning of the concave wall supports and the computer components. At this point, natural compression of the heated air occurs. The natural air compression induces a force within the heated air and accelerates its ascent, such that as it ascends, it is further directed to the outside corners of the encasement module and ultimately forced outside through the ventilation ports in the encasement. The path of the heated air is that of least resistance created by the design of the encasement. As the heated air is purged, there becomes a void in the bottom of the encasement module where the volume of heated air originated. As a result, ambient air is naturally sucked or drawn into the bottom of the encasement module, also through the ventilation ports, thus replacing the air forced out of the encasement. As this ambient air is drawn in, it is also heated and begins the ascent just described. This natural passive cycle and circular pattern of air flow is continually occurring during operation of the processing control unit and functions to cool the interior of the encasement and the computer components therein to ensure proper operation. The process is described herein as cooling by natural convection.

The present invention processing control unit presents a complete paradigm shift from conventional computer encasements. Essentially, what is provided is a processing control unit that contains no peripheral devices and is therefore very small, and that provides a unique cooling or heat dissipation system. If desired, the processing control unit may function as a normal computer with peripherals components electrically connected to the processing control unit using various input/output interface connections. However, the processing control unit may also be adapted to fit within various environments, devices, and assemblies that prior related computer encasements were unable to function within. This is in large part due to its durable construction, its small size, its mountability, and its ability to provide for scaled processing, wherein two or more processing control units are process-coupled together to increase the overall computing power.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

FIG. 14-B illustrates the clustering or modular characteristics and capabilities of the present invention non-peripherals computer according to one embodiment of the present invention.

DETAILED DESCRIPTION OF THE PREFERRED EMBODIMENTS

Figure 1:
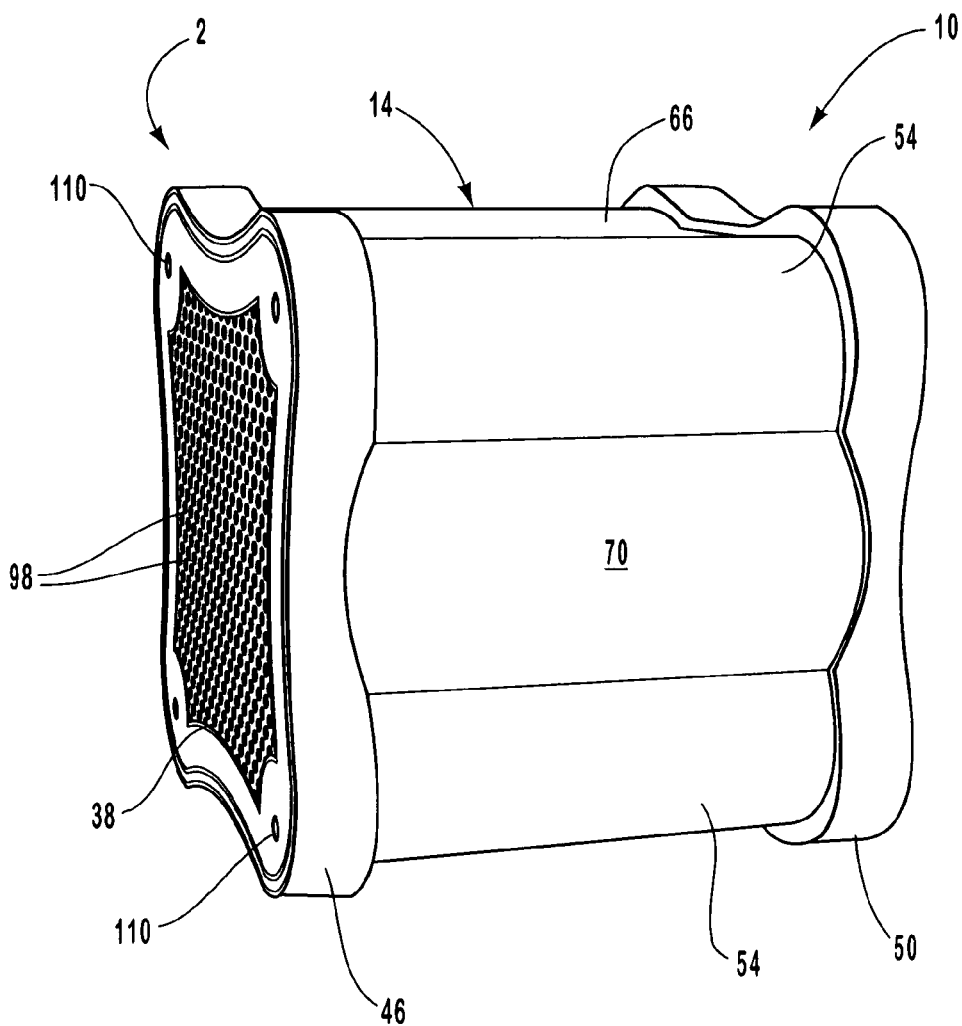
FIG. 1 illustrates a perspective view of the assembled non-peripherals computer encasement according to one embodiment of the present invention.

It will be readily understood that the components of the present invention, as generally described and illustrated in the figures herein, could be arranged and designed in a wide variety of different configurations. Thus, the following more detailed description of the embodiments of the system and method of the present invention, and represented in FIGS. 1 through 14-B, is not intended to limit the scope of the invention, as claimed, but is merely representative of the presently preferred embodiments of the invention.

The presently preferred embodiments of the invention will be best understood by reference to the drawings wherein like parts are designated by like numerals throughout.

The present invention describes a method and system for providing a unique and proprietary non-peripherals-based processing control unit and the encasement module utilized to house or embody the various circuitry and other computer components within the proprietary non-peripherals-based processing control unit. In association with the non-peripherals-based processing control unit, the present invention further describes a unique method and system for dissipating or transferring heat from the processing control unit as generated from the processing components, circuitry, and other components existing and functioning within the processing control unit, per the strategic design and assembly of the encasement module.

The specific features and characteristics of the present invention will be provided for and described below in two primary sections of discussion. The first description section and area of discussion focuses on and provides for the specific physical characteristics, features, functions, abilities, and advantages of the proprietary non-peripherals-based processing control unit, namely the proprietary encasement module or housing adapted to embody the components of the processing control unit. The second description section and area of discussion focuses on the thermodynamics of the processing control unit, namely the encasement module, including its heat generating or production properties and the unique devices, systems, design elements, and components employed to dissipate heat from the interior of the processing control unit, or rather to cool the processing control unit.

Proprietary Encasement Module

With specific reference to FIGS. 1 and 2, the present invention features in one exemplary embodiment, and the figures illustrate, a proprietary non-peripherals or non-peripherals-based processing control unit 2 (hereinafter referred to as "processing control unit 2") shown in perspective view. In it simplest form, processing control unit 2 comprises a proprietary encasement module 10 (hereinafter referred to as "encasement module 10"), as well as a proprietary printed circuit board design (shown in FIG. 8). Processing control unit 2, through the specific and calculated design of encasement module 10, provides unparalleled computer processing advantages and features not found in prior art processing units or computers. Indeed, the present invention processing control unit as described and claimed herein presents a complete conceptual shift, or paradigm shift, from conventional computers or processing control units. This paradigm shift will become evident from the subject matter of the disclosure below, which subject matter is embodied in the appended claims.

Figure 2:
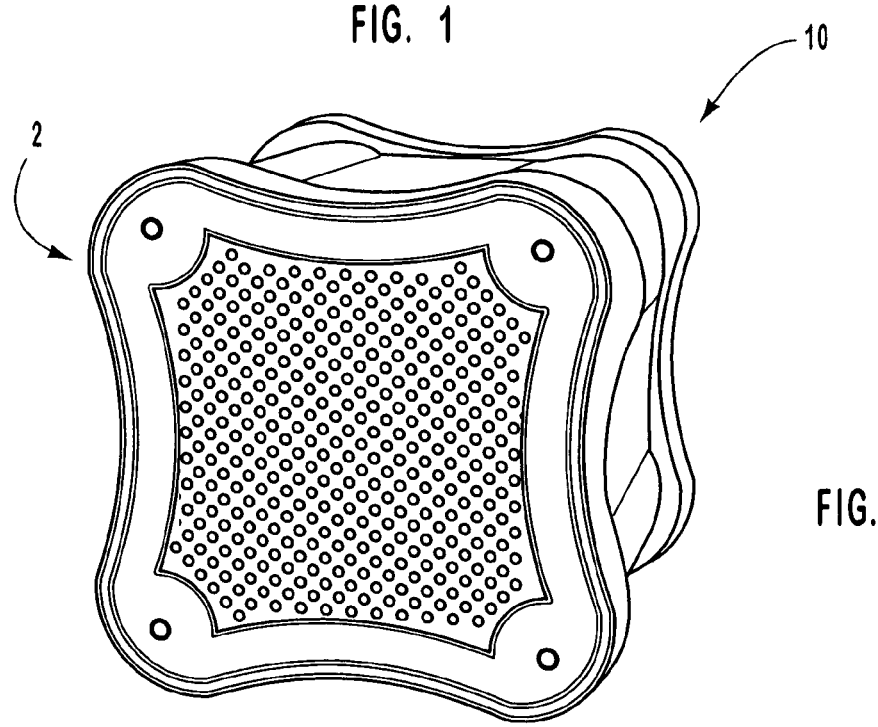
FIG. 2 illustrates a substantially front view of the assembled non-peripherals computer encasement according to one embodiment of the present invention.

FIGS. 1 and 2 show processing control unit 2 in its fully assembled state with many of the primary components of processing control unit 2 generally illustrated. As stated, processing control unit 2 comprises encasement module 10, which itself has a very specific and unique support structure and geometric configuration or design that is more fully described in FIG. 3. In one exemplary, and preferred embodiment, encasement module 10 comprises a main support chassis 14; first insert 66; second insert 70; third insert 74 (not shown); dynamic back plane 34 (not shown); first end plate 38; second end plate 42 (not shown); first end cap 46; and second end cap 50 to provide an enclosed housing or encasement for one or more processing and other computer components, such as printed circuit boards, processing chips, and circuitry disposed therein.

Figure 3:
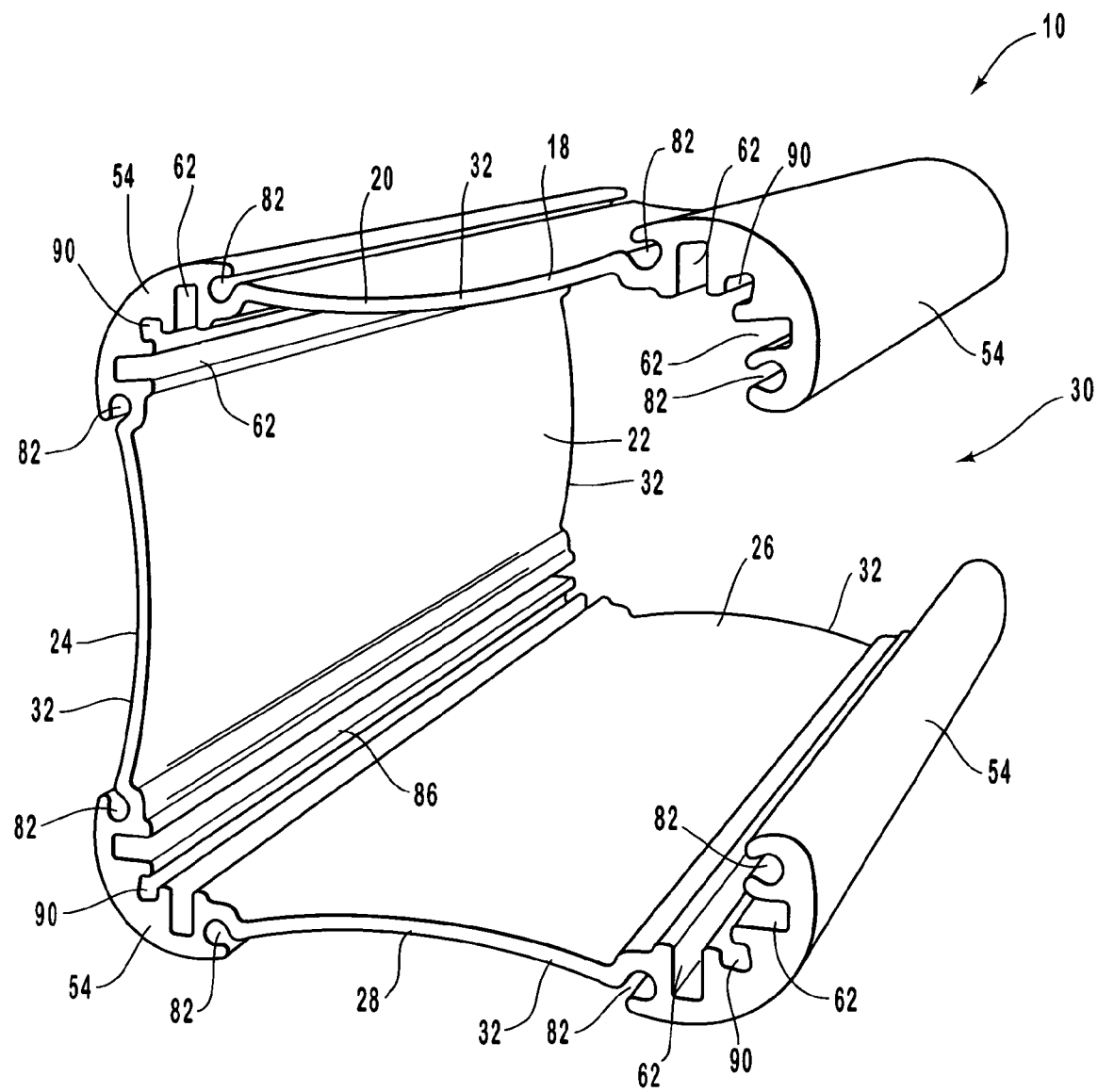
FIG. 3 illustrates a perspective view of a disassembled non-peripherals computer encasement, and particularly the main support chassis according to one embodiment of the present invention.
Figure 4:
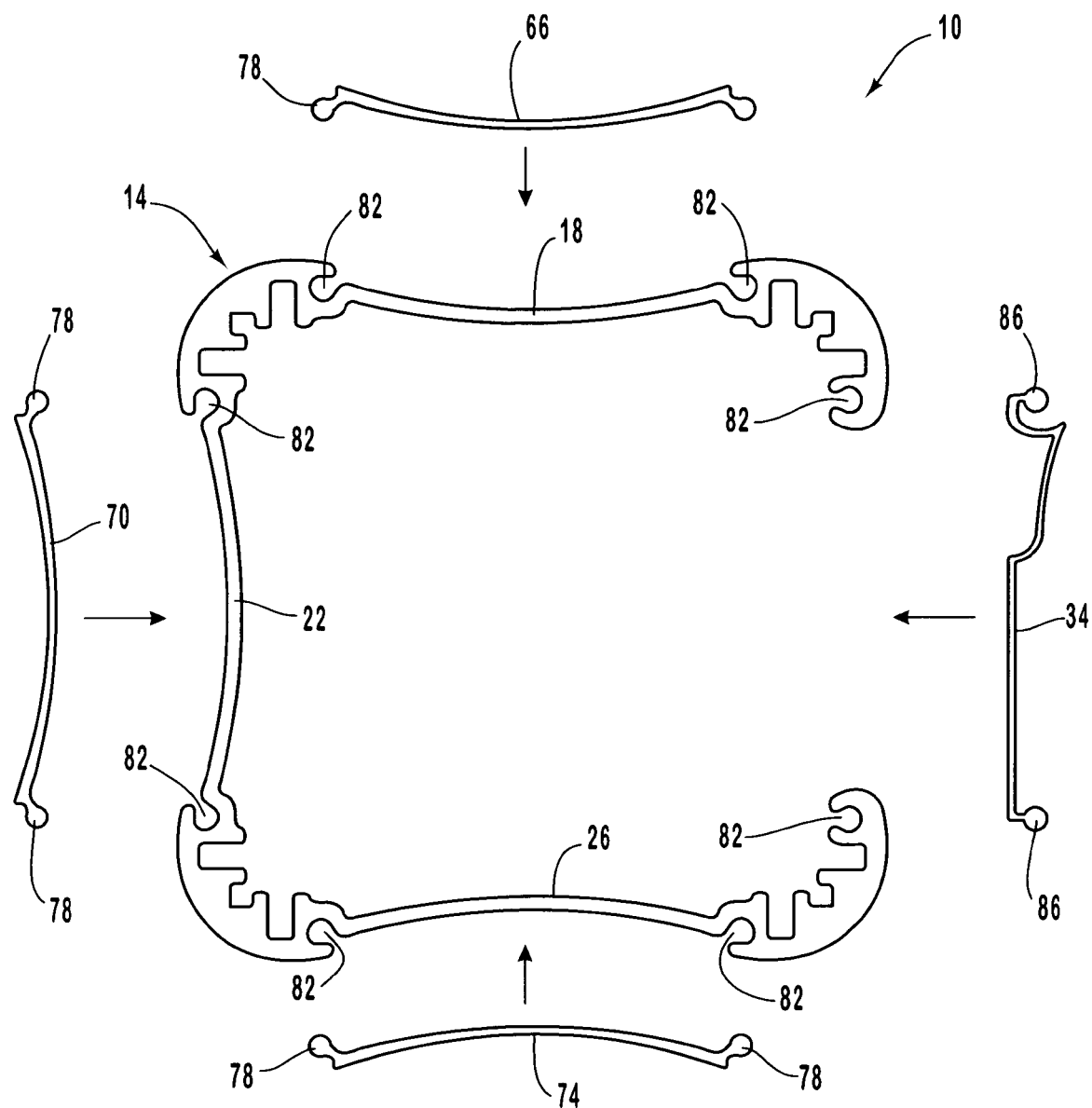
FIG. 4 illustrates an exploded side view of the main support chassis, as well as the inserts and back support or dynamic back plane according to one embodiment of the present invention.

FIGS. 3 and 4 illustrate an exemplary embodiment of main support chassis 14 and some of the component parts of encasement module 10 as designed to attach or couple to main support chassis 14. Preferably, these component parts are removably coupled to primary chassis 14, as shown, in order to enable some of the unique features and functions of processing control unit 2 as described and set forth herein. Main support chassis 14 serves as the primary support structure for encasement module 10 and processing control unit 2. Its small size and proprietary design provide advantages and benefits not found in prior art designs. Essentially, main support chassis 14 provides structural support for the component parts of processing control unit 2, including any additional physical attachments, processing and other circuit board components, as well as enabling processing control unit 2 to be adaptable to any type of environment, such as incorporation into any known structure or system, or to be used in clustered and multi-plex environments.

Specifically, as shown in each of the figures, processing control unit 2, and particularly encasement module 10, is essentially comprised of a cube-shaped design, wherein first, second, and third wall supports 18, 22, and 26 of main support chassis 14, along with dynamic back plane 34 when attached, comprise the four sides of encasement module 10, with a union module 54 positioned at each corner of encasement module 10.

Junction center 54 function to integrally join first, second, and third wall supports 18, 22, and 26, as well as to provide a base to which the end plates discussed below may be attached. End plates are coupled to main support chassis 14 using attachment means as inserted into attachment receipt 90, which is shown in FIG. 3 as an aperture, which may be threaded or not depending upon the particular type of attachment means used. Junction center 54 further provide the primary support and the junction center for the proprietary printed circuit board design existing within processing control unit 2 as discussed below. As shown in FIG. 3, printed circuit boards are capable of being inserted into and secured within one or more channeled board receivers 62. The particular design shown in the figures and described herein is merely an example of one embodiment or means for securing or engaging printed circuit boards within processing control unit 2. Other designs, assemblies, or devices are contemplated and may be used as recognized by one ordinarily skilled in the art. For instance, means for securing processing components may include screws, rivets, interference fits, and others commonly known.

Main support chassis 14 further comprises a plurality of slide receivers 82 designed to receive a corresponding insert located on one or more insert members, a dynamic back plane, or a mounting bracket of some sort used to couple two or more processing control units together, or to allow the processing control unit to be implemented into another structure, such as a Tempest superstructure. Slide receivers 82 may also be used to accept or receive suitable elements of a structure or a structure or device itself, wherein the processing control unit, and specifically the encasement module, serves as a load bearing member. The ability of processing control unit 2 to function as a load bearing member is derived from its unique chassis design. For example, processing control unit 2 may be used to bridge two structures together and to contribute to the overall structural support and stability of the structure. In addition, processing control unit 2 may bear a load attached directly to main support chassis 14. For example, a computer screen or monitor 170 may be physically supported and process controlled by processing control unit 2. As further examples, processing control unit 2 may be used to physically support and process control various home fixtures, such as a lighting fixture, or a breaker box, etc. Moreover, if needed, an additional heat sink assembly may be coupled to processing control unit 2 in a similar manner. Many other possible load bearing situations or environments are possible and contemplated herein. Thus, those specifically recited herein are only meant to be illustrative and not limiting in any way. Slide receivers 82 are shown as substantially cylindrical channels running the length of the junction center 54 of main support chassis 14. Slide receivers 82 comprise merely one means of coupling external components to main support chassis 14. Other designs or assemblies are contemplated and may be used to carry out the intended function of providing means for attaching various component parts such as those described above as recognized by one ordinarily skilled in the art.

Figure 5:
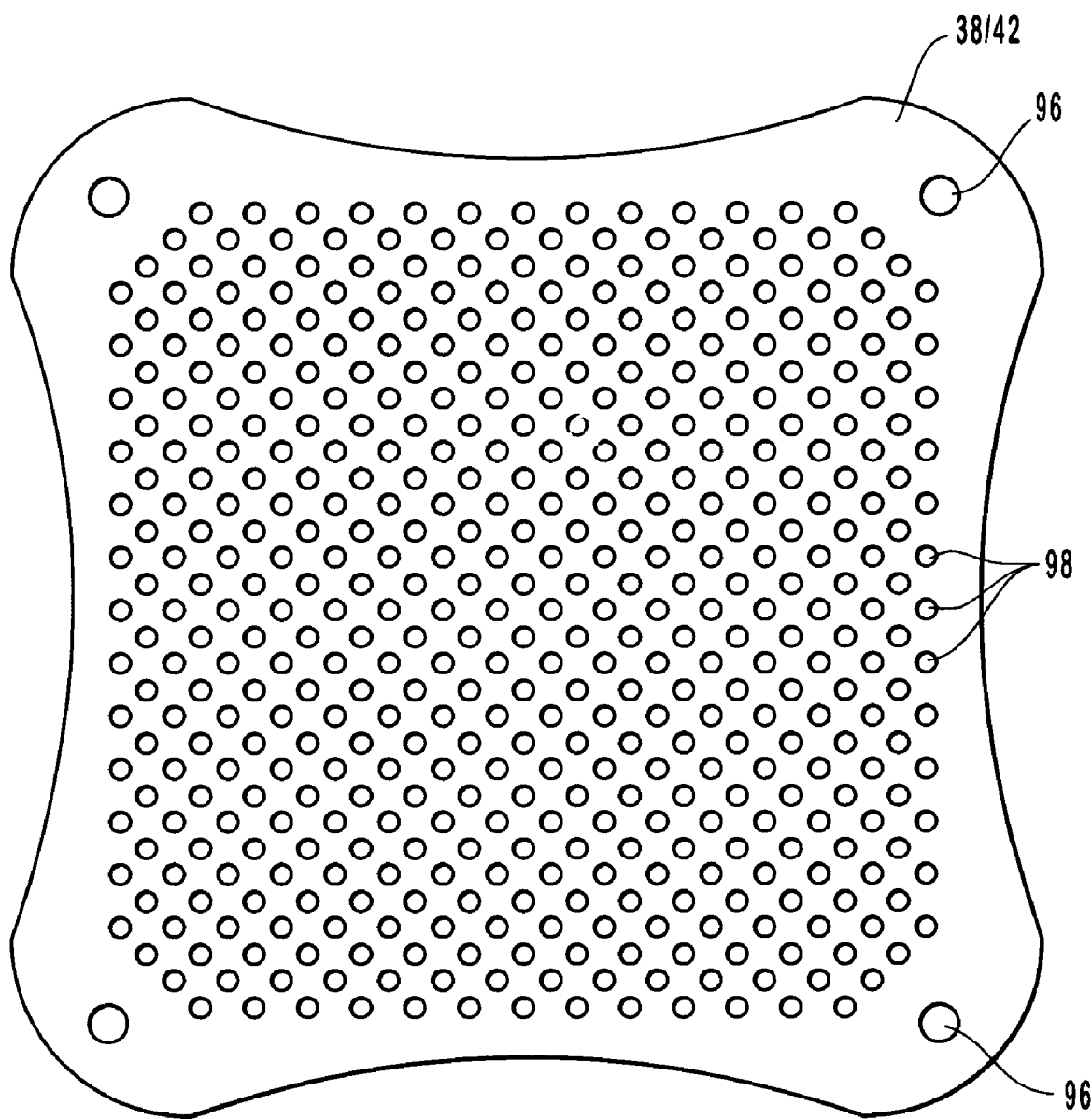
FIG. 5 illustrates a top view of an end plate as designed to be coupled to the ends of the main support chassis according to one embodiment of the present invention.
Figure 6:
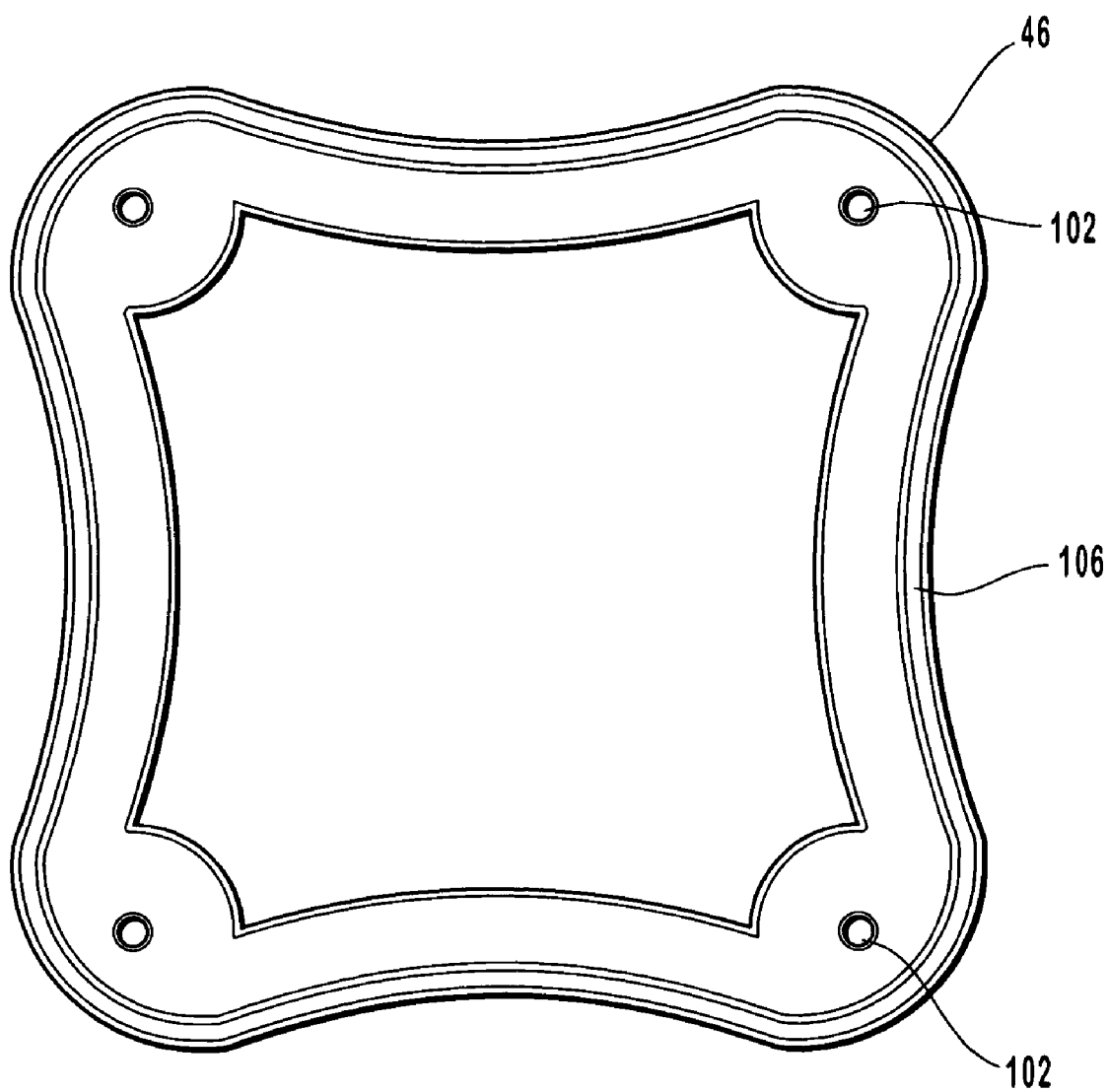
FIG. 6 illustrates a top view of an end cap designed to fit over and/or couple to an edge portion of the main support chassis according to one embodiment of the present invention.

FIGS. 3 and 4 further illustrate the concave nature of main support chassis 14, and particularly first, second, and third wall supports 18, 22, and 26. First, second, and third insert members 66, 70, and 74 comprise corresponding concave designs. Each of these component parts further comprise a specifically calculated radius of curvature, such that first wall support 18 comprises a radius of curvature 20 to correspond to a mating radius of curvature designed into first insert 66. Likewise, second wall support 22 comprises a radius of curvature 24 to correspond to a mating radius of curvature designed into second insert 70, and third wall support 26 comprises a radius of curvature 28 to correspond to a mating radius of curvature designed into third insert 74. End plates 38 and 42, as well as end caps 46 and 50, as illustrated in FIGS. 5 and 6, each comprise similar design profiles to match the concave design profile of main support chassis 14. In the embodiment shown in the figures, the wall supports comprise a radius of curvature of approximately 2.8 inches, and insert members comprise a radius of curvature of approximately 2.7 inches. The concaved design and the calculated radius' of curvature each contribute to overall structural rigidity and strength of main support chassis 14, as well as contributing to the thermodynamic heat dissipating properties of processing control unit 2. For example in a natural convection cooling system, described in greater detail below, the concaved design facilitates the distribution of heated air to the outer, and primarily upper, corners of encasement module 10, thus allowing heat or heated air to be dispersed away from the top and center of the interior portion of processing control unit 2 and towards the upper right and left corners, where it may then escape through ventilation ports 98 or where it may be further conducted through the top of encasement module 10. Other embodiments are contemplated where the radius' of curvature of these elements may differ from one another to provide the most optimal design of encasement module 10 as needed.

In a preferred embodiment, main support chassis 14 comprises a full metal chassis that is structured and designed to provide an extremely strong support structure for processing control unit 2 and the components contained therein. Under normal circumstances, and even extreme circumstances, main support chassis 14 is capable of withstanding very large applied and impact forces originating from various external sources, such as those that would normally cause disfiguration or denting to prior related computer encasements, or limit their ability to be used in other or extreme environments. Essentially, main support chassis 14 is the main contributor to providing a virtually indestructible computer encasement for processing control unit 2. This unique feature in a computer encasement is in direct relation to the particular design of the components used to construct encasement module 10, including their geometric design, the way they are fit together, their material composition, and other factors, such as material thickness. Specifically, encasement module 10 is preferably built entirely out of radiuses, wherein almost every feature and element present comprises a radius. This principle of radiuses is utilized to function so that any load applied to processing control unit 2 is transferred to the outer edges of processing control unit 2. Therefore, if a load or pressure is applied to the top of encasement module 10, that load would be transferred along the sides, into the top and base, and eventually into the corners of encasement module 10. Essentially, any load applied is transferred to the corners of processing control unit 2, where the greatest strength is concentrated.

Processing control unit 2 and its components, namely encasement module 10, main support chassis 14, inserts 66, 70, and 74, dynamic back plane 34, and end plates 38 and 42, are each preferably manufactured of metal using an extrusion process. In one exemplary embodiment, main support chassis 14, first, second, and third inserts 66, 70, and 74, dynamic back plane 34, and first and second end plates 38 and 42 are made of high-grade aluminum to provide strong, yet light-weight characteristics to encasement module 10. In addition, using a metal casing provides good heat conducting properties. Although preferably constructed of aluminum or various grades of aluminum and/or aluminum composites, it is contemplated that various other materials, such as titanium, copper, magnesium, the newly achieved hybrid metal alloys, steel, and other metals and metal alloys, as well as plastics, graphites, composites, nylon, or a combination of these depending upon the particular needs and/or desires of the user, may be used to construct the main components of encasement module 10. In essence, the intended environment for or use of the processing control unit will largely dictate the particular material composition of its constructed components. As stated, an important feature of the present invention is the ability of the processing control unit to adapt and be used for several uses and within several different and/or extreme environments. As such, the specific design of the processing control unit relies upon a concerted effort to utilize the proper material. Stated differently, the processing control unit of the present invention contemplates using and comprises a pre-determined and specifically identified material composition that would best serve its needs in light of its intended use. For example, in a liquid cooled model or design, a more dense metal, such as titanium, may be used to provide greater insulative properties to the processing control unit.

Given its preferred aluminum composition, encasement module 10 is very strong, light-weight, and easy to move around, thus providing significant benefits extending to both the end user and the manufacturer. For example, from an end user standpoint, processing control unit 2 may be adapted for use within various environments in which prior related computers could not be found. In addition, an end user may essentially hide, mask, or camouflage processing control unit 2 to provide a more clean looking, less-cluttered room, or to provide a more aesthetically appealing workstation.

From a manufacturing standpoint, encasement module 10 and processing control unit 2 are capable of being manufactured using one or more automated assembly processes, such as an automated aluminum extrusion process-coupled with an automated robotics process for installing or assembling each of the component parts as identified above. Equally advantageous is the ability for encasement module 10 to be quickly mass-produced as a result of its applicability to an extrusion and robotics assembly process. Of course, processing control unit 2 may also be manufactured using other known methods, such as die casting and injection molding, hand assembly depending upon the particular characteristics desired and the particular intended use of the processing control unit.

In addition, since encasement module 10 is small in size and relatively light-weight, shipping costs, as well as manufacturing costs, are also greatly reduced.

With reference to FIG. 4, shown are the main components of encasement module 10, namely main support chassis 14 and the several inserts that are designed to removably attach or couple to the sides of main support chassis 14. FIG. 4 also illustrates dynamic back plane 34 as it is designed to removably attach or couple to the rear portion of main support chassis 14.

Specifically, first insert 66 attaches to first wall support 18. Second insert 70 attaches to second wall support 22. Third insert 74 attaches to third wall support 26. Moreover, each of first, second, and third inserts 66, 70, and 74, and first, second, and third wall supports 18, 22, and 26 comprise substantially the same radius of curvature so that they may mate or fit together in a nesting or matching relationship.

Each of first, second and third inserts 66, 70, and 74 comprise means for coupling main support chassis 14. In one exemplary embodiment, as shown in FIG. 4, each insert comprises two insert engagement members 78 located at opposing ends of the insert. Engagement members 78 are designed to fit within a means for engaging or coupling an external member formed within main support chassis 14. In the exemplary embodiment shown, means for engaging an external member comprises a plurality of slide receivers 82 positioned along main support chassis 14 as shown and identified above in FIG. 3. Other means are also contemplated, such as utilizing various attachments ranging from snaps, screws, rivets, interlocking systems, and any others commonly known in the art.

Dynamic back plane 34 is also designed for or is capable of releasably coupling main support chassis 14. Dynamic back plane 34 comprises means for engaging main support chassis 14. In the exemplary embodiment shown, means for engaging is comprised of two engagement members 86 positioned at opposing ends of dynamic back plane 34. Engagement members 86 fit within slide receivers 82 at their respective locations along the rear portion of main support chassis 14 (shown as space 30) to removably attach dynamic back plane 34 to main support chassis 14, much the same way inserts 66, 70, and 74 attach to main support chassis 14 at their respective locations. These particular features are intended as one of several possible configurations, designs, or assemblies. Therefore, it is intended that one skilled in the art will recognize other means available for attaching dynamic back plane 34 to main support chassis 14 other than those specifically shown in the figures and described herein.

Means for engaging an external member, and particularly slide receiver 82, is capable of releasably coupling various types of external members, such as inserts 66, 70, and 74, dynamic back plane 34, mounting brackets, another processing control unit, or any other needed device, structure, or assembly. As illustrated in FIG. 4, slide receivers 82 engage corresponding engagement members 78 in a releasable manner so as to allow each insert to slide in and out as needed. As stated, other means for coupling main support chassis 14 and means for engaging an external member are contemplated herein, and will be apparent to one skilled in the art.

By allowing each insert and dynamic back plane 34 to be removably or releasably coupled to main support chassis 14, several significant advantages to processing control unit 2, over prior related computer encasements, are achieved. For example, and not intended to be limiting in any way, first, second, and third inserts 66, 70, and 74 may be removed, replaced, or interchanged for aesthetic purposes. These insert members may possess different colors and/or textures, thus allowing processing control unit 2 to be customized to fit a particular taste or to be more adaptable to a given environment or setting. Moreover, greater versatility is achieved by allowing each end user to specify the look and overall feel of their particular unit. Removable or interchangeable insert members also provide the ability to brand (e.g., with logos and trademarks) processing control unit 2 for any company entity or individual using the unit. Since they are external to main support chassis 14, the insert members will be able to take on any form or branding as needed.

Aside from aesthetics, other advantages are also recognized. On a higher level of versatility, means for engaging an external member provides processing control unit 2 with the ability to be robust and customizable, such as being docked in a mobile setting or in a proprietary docking station where it may serve as the control unit for any conceivable object, such as boats, cars, planes, and other items or devices that were heretofore unable to comprise a processing control unit, or where it was difficult or impractical to do so.

With reference to FIG. 5, shown is an illustration of one of first end plate 38 or second end plate 42 that couple to first and second end portions 40 and 44 of primary chassis 14, respectively, and function to provide means for allowing air to flow or pass in and out of the interior of processing control unit 2. First and second end plates 38 and 42 function with first and second end caps 46 and 50 (shown in FIG. 6), respectively, to provide a protective and functional covering to encasement module 10. First and second end plates 38 and 42 attach to main support chassis 14, using attachment means 110 (as shown in FIG. 1). Attachment means 110 typically comprises various types of screws, rivets, and other fasteners as commonly known in the art, but may also comprise other systems or devices for attaching first and second end plates 38 and 42, along with first and second end caps 46 and 50, to main support chassis 14, as commonly known in the art. In an exemplary embodiment, attachment means 110 comprises a screw capable of fitting within the respective attachment receivers 90 located in union module 54 at the four corners of main support chassis 14 (attachment receivers 90 and union module 54 are illustrated in FIG. 3).

Structurally, first and second end plates 38 and 42 comprise a geometric shape and design to match that of end portions 40 and 44 of main support chassis 14. Specifically, as shown in FIG. 5, the perimeter profile of first and second end plates 38 and 42 comprises a series of concave edges, each having a radius of curvature to match those of the respective wall supports and dynamic back plane. Essentially, end plates 38 and 42 serve to close off the ends of encasement module 10 by conforming to the shape of encasement module 10, whatever that may be.

One of the primary functions of first and second end plates 38 and 42 is to provide means for facilitating or allowing the influx of air into and efflux of air out of encasement module 10. In an exemplary embodiment as shown in FIG. 5, such means comprises a plurality of apertures or ventilation ports 98 intermittently spaced along the surface or face of and extending through end plates 38 and 42. As explained in the thermodynamics section below, in one embodiment, computer processing center 2 utilizes natural convection to cool the processing components contained therein. By equipping end plates 38 and 42 with ventilation ports 98 ambient air is allowed to enter into the interior of processing control unit 2, while the heated air, as generated from the processors and other components located within the interior of processing control unit 2, is allowed to escape or flow from the interior to the outside environment. By natural physics, heated air rises and is forced out of encasement module 10 as cooler air is drawn into encasement module 10. This influx and efflux of ambient and heated air, respectively, allows processing control unit 2 to utilize a natural convection cooling system to cool the processors and other internal components functioning or operating within processing control unit 2. Ventilation ports 98 are preferably numerous, and span a majority of the surface area of end plates 38 and 42, and particularly the outer perimeter regions, thus enabling increased and efficient cooling of all internal components in an air-cooled model. Ventilation ports 98 are machined to exact specifications to optimize airflow and to constrict partial flow into encasement module 10. By constricting some flow, dust and other sediments or particles are prohibited from entering the interior of encasement module 10 where they can cause damage to and decreased performance of processing control unit 2. Indeed, ventilation ports 98 are sized to only allow air particles to flow therethrough.

Because encasement module 10 is preferably made of metal, the entire structure, or a portion of the structure, can be positively or negatively charged to prohibit dust and other particles or debris from being attracted to the encasement. Such an electrostatic charge also prevents the possibility of a static charge jumping across dust and other elements and damaging the main board. Providing an electrostatic charge is similar to ion filtering, only opposite. By negatively charging encasement module 10, all positively charged ions (i.e. dust, dirt, etc.) are repelled.

FIG. 6 illustrates first end cap 46 and second end cap 50, which are designed to fit over first and second end plates 38 and 42, respectively, as well as over a portion of each end portion 40 and 44 of main support chassis 14. These end caps are preferably made of some type of impact absorbing plastic or rubber, thus serving to provide a barrier of protection to processing control unit 2, as well as to add to its overall look and feel.

In one exemplary, yet preferred embodiment, processing control unit 2 comprises a rather small footprint or size relative to or as compared with conventional computer encasements. For example, in an exemplary embodiment, its geometric dimensions are approximately 3.6 inches in length, 3.6 inches in width, and 3.6 inches in height, which are much smaller than prior related conventional processing control units, such as desktop computers or even most portable computers or laptops. In addition to its reduced dimensional characteristics, processing control unit 2 comprises rather unique geometrical characteristics as well. FIGS. 1 and 2 illustrate this unique shape or geometry, most of which has been discussed above. These dimensional and geometrical characteristics are proprietary in form and each contribute to the specific, unique functional aspects and performance of processing control unit 2. They also provide or lend themselves to significant features and advantages not found in prior related processing control units. Stated differently, the proprietary design of processing control unit 2 as described and shown herein allows it to perform in ways and to operate in environments that are otherwise impossible for prior related conventional computer encasements and processing units.

It is important to describe that processing control unit 2 can take on any size and/or geometric shape. Although in the preferred embodiment processing control unit 2 is substantially cube-shaped having a 3.6×3.6×3.6 size, other sizes and shapes are intended to be within the scope of the present invention. Specifically, as recited herein, the processing control unit may be adapted for use in various structures or super structures, such as any conceivable by one ordinarily skilled in the art. In this sense, processing control unit 2 must be able to comprise a suitable size and structure to be able to take on the physical attributes of its intended environment. For example, if processing control unit is to be used within a thin hand-held device, it will be constructed having a thin profile physical design, thus deviating away from the cube-like shape of the preferred embodiment. As such, the various computer and processing components used within processing control unit 2 are also capable of associated sizes and shapes and designs.

As apparent from its size, processing control unit 2 comprises none of the peripheral components that are typically found in prior art computer encasements, such as a desktop personal computer or a laptop. Hence the phrase "non-peripherally-based." Indeed, processing control unit 2 comprises a proprietary non-peripheral design, with the term "peripheral" referring to any one of or all of the several types of existing components commonly known in the art and commonly housed within prior art computer encasements. Preferably, any peripheral devices are process coupled to processing control unit 2, but are not physically included in the makeup of the unit. Peripheral devices may be attached or coupled using the methods described herein, such as through a slide-on, or snap-on system. Obviously, however, if desired, processing control unit 2 may be designed to include any conventional peripheral devices as found in the prior art, such as a hard drive, a CD-ROM drive, memory storage devices, etc. The present invention, therefore, is not limited to a non-peripheral design.

Some of the most common types of peripheral devices or components are mass or media storage devices, such as hard disk drives, magnetic disk drives, magnetic cassette drives, and optical disk drives (e.g. hard drives, floppy disc drives, CD-ROM drives, DVD drives, Zip drives, etc.), video cards, sound cards, and internal modems. All these types of peripheral devices or components, although not actually physically supported by or physically present within encasement module 10 and processing control unit 2, are nonetheless still intended to be compatible, functional, and/or operational with processing control unit 2 as designed. It should be noted that these described devices are typically considered peripherals. However, these items may also be integrated or embedded into the printed circuit board design of processing control unit 2, wherein they do not comprise or are considered peripherals, but are instead part of the logic of the printed circuit board design of processing control unit 2.

Although preferably containing no internal peripheral devices as identified above, processing control unit 2 still preferably comprises a system bus as part of its internal architecture. The system bus is designed to function as commonly known in the art, and is configured to connect and make operable the various external components and peripheral devices that would otherwise be internal. The system bus also enables data to be exchanged between these components and the processing components of processing control unit 2.

The system bus may include one of a variety of bus structures including a memory bus or memory controller, a peripheral bus, or a local bus that uses any one of a variety of bus architectures. Typical components connected by the system bus include a processing system and memory. Other components may include one or more mass storage device interfaces, one or more input interfaces, one or more output interfaces, and/or one or more network interfaces.

Processing control unit 2, although designed or intended to outperform prior related computer systems, is designed to be at least as functional as these computer systems. Therefore, everything a user is capable of doing on a typical or commonly known computer system (e.g. a desktop computing system) can be done on the computer system of the present invention. From a practical standpoint, this means that no functions or operations are sacrificed, but many are gained. As such, to be able to accomplish this using the proprietary design described herein, processing control unit 2 must be able execute similar tasks as prior related computers or computer processors, as well as to be able to access or utilize those components required to perform such tasks.

To function as a computing unit, processing control unit 2 comprises the necessary means for connecting these various identified peripherals and other hardware components, even though they are preferably located without or are remotely located from encasement module 10. Therefore, the present invention processing control unit 2 comprises various connection means for providing the necessary link between each peripheral device and the processing components contained within processing control unit 2. For example, one or more mass storage device interfaces may be used to connect one or more mass storage devices to the system bus of processing control unit 2. The mass storage devices are peripheral to processing control unit 2, but allow it to retain large amounts of data. As stated above, examples of a mass storage device include hard disk drives, magnetic disk drives, tape drives and optical disk drives. A mass storage device may read from and/or write to a magnetic hard disk, a removable magnetic disk, a magnetic cassette, an optical disk, or another computer readable medium. Mass storage devices and their corresponding computer readable media provide nonvolatile storage of data and/or executable instructions that may include one or more program modules such as an operating system, one or more application programs, other program modules, or program data.

One or more input interfaces may also be employed to enable a user to enter data and/or instructions into processing control unit 2 through one or more corresponding input devices. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces that may be used to connect the input devices to the system bus include a serial port, a parallel port, a game port, a universal serial bus ("USB"), a firewire (IEEE 1394), or another interface.

One or more output interfaces may also be employed to connect one or more corresponding output devices to the system bus. Examples of output devices include a monitor or display screen, a speaker system, a printer, and the like. These particular output devices are also peripheral to (without) processing control unit 2. Examples of output interfaces include a video adapter, an audio adapter, a parallel port, and the like.

In another embodiment, any peripheral devices used are connected directly to the system bus without requiring an interface. This embodiment is fully described in co-pending U.S. patent application Ser. No. 10/691,114, filed Oct. 22, 2003, and entitled, "Systems and Methods for Providing a Dynamically Modular Processing Unit," which is incorporated by reference in its entirety herein.

Providing a non-peripherals computer system gives users many advantages over larger, peripheral packed computer units. Some of the advantages may be that the user is able to reduce the space required to accommodate the computer unit and system. Indeed, the present invention processing control unit may be set directly atop a desk, or may be hidden from view completely. The potential storage locations are endless. Processing control unit 2 may even be camouflaged within some type of desk-top piece, such as a clock, to hide it from view. Other features may include a relative reduction in noise and generated heat, or universal application to introduce intelligence or "smart" technology into various items, assemblies, or systems. These and other examples are apparent from the disclosure herein.

As described above, the present invention processing control unit 2 was designed to have certain mainstream components exterior to encasement module 10 for multiple reasons. First, because of its small size, yet powerful processing capabilities, processing control unit 2 may be implemented into various devices, systems, vehicles, or assemblies to enhance these as needed. Common peripheral devices, such as special displays, keyboards, etc., can be used in the traditional computer workstation, but processing control unit 2 can also be without peripherals and customized to be the control unit for many items, systems, etc. In other words, processing control unit 2 may be used to introduce "smart" technology into any type of conceivable item of manufacture.

Second, regarding cooling issues, most of the heat generated within the interior of a computer comes from two places—the computer processor and the hard drive. By removing the hard drive from the encasement module 10 and putting it within its own encasement exterior to processing control unit 2, better and more efficient cooling is achieved. By improving the cooling properties of the system, the lifespan or longevity of the processor itself is increased, thus increasing the lifespan and longevity of the entire computer processing system.

Third, processing control unit 2 preferably comprises an isolated power supply. By isolating the power supply from other peripherals more of the supplied voltage can be used just for processing versus using the same voltage to power the processor in addition to one or more peripheral components, such as a hard drive and/or a CD-ROM, existing within the system. In a workstation model, the peripheral components will exist without processing control unit 2 and will be preferably powered by the monitor power supply.

Fourth, preferably no lights or other indicators are employed to signify that processing control unit 2 is on or off or if there is any disk activity. Activity and power lights still may be used, but they are preferably located on the monitor or other peripheral housing device. This type of design is preferred as it is intended that the system be used in many applications where lights would not be seen or where they would be useless, or in applications where they would be destructive, such as dark rooms and other photosensitive environments. Obviously however, exterior lighting, such as that found on conventional computer systems to show power on or disk use, etc., may be implemented or incorporated into the actual processing control unit 2, if so desired.

Fifth, passive coating systems, such as a natural convection system may be used to dissipate heat from the processing control unit, rather than requiring some type of mechanical or forced air systems, such as a fan, or any other cooling members or systems. Of course, such forced air systems are also contemplated for use and may be incorporated, if desired. These advantages are not all inclusive. Other features and advantages will be recognized by one skilled in the art.

Figure 7:
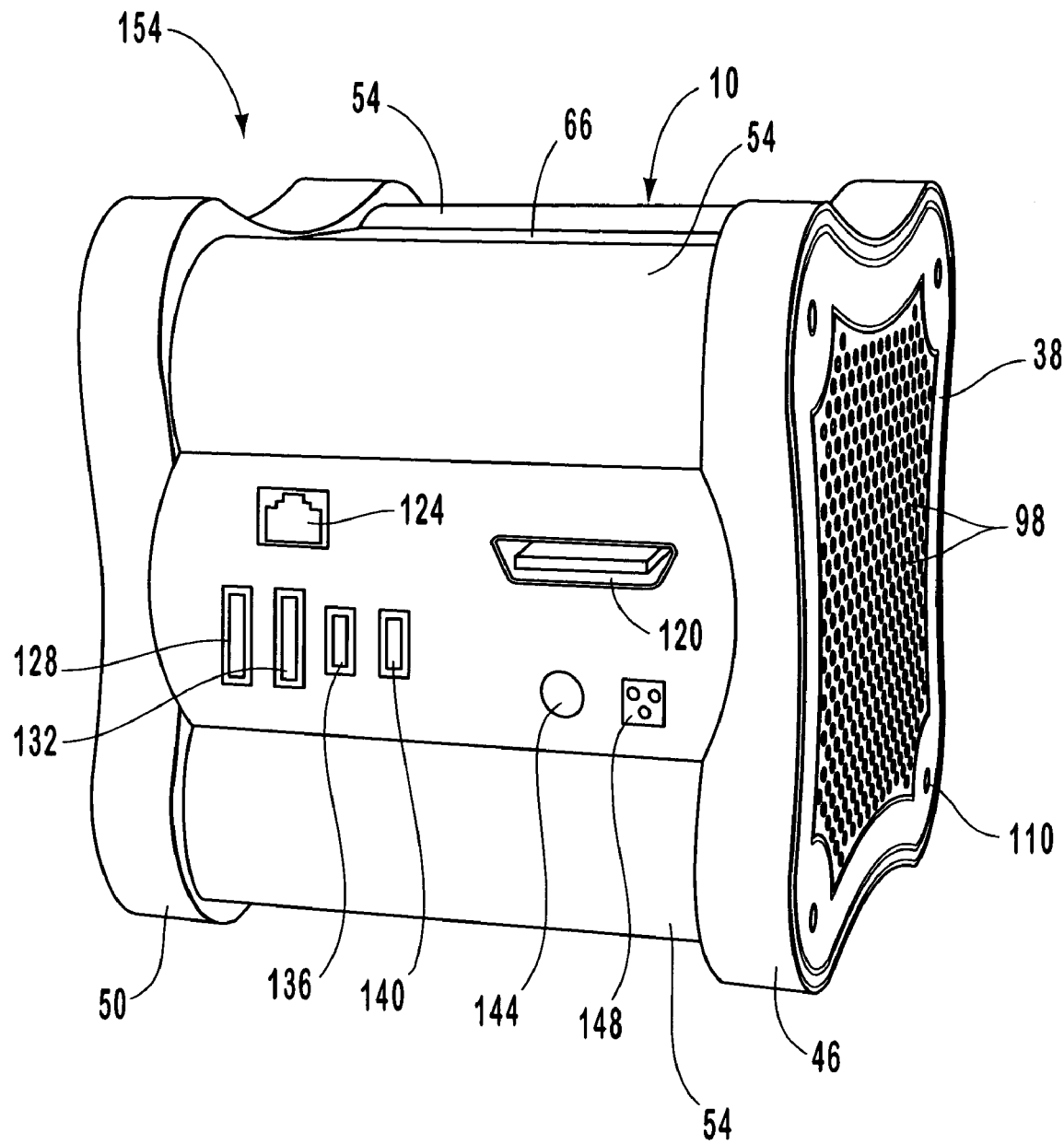
FIG. 7 illustrates the dynamic back plane having one or more input/output ports and a power port located thereon to couple various components to the non-peripheral computer.

With reference to FIG. 7, shown is processing control unit 2, and particularly encasement module 10, in an assembled state having first end plate 38 and second end plate 42 (not shown), first and second end caps 46 and 50, inserts 66, 70 (not shown), and 74 (not shown), as well as dynamic back plane 34 attached thereto. Dynamic back plane 34 is designed to comprise the necessary ports and associated means for connecting that are used for coupling various input/output devices and power cords to processing control unit 2 to enable it to function, especially in a workstation environment. While all the available types of ports are not specifically shown and described herein, it is intended that any existing ports, along with any other types of ports that come into existence in the future, or even ports that are proprietary in nature, are to be compatible with and capable of being designed into and functional with processing control unit 2. Preferably, this is accomplished by designing a different and dynamic interchanging back plane 34 as needed.

Specifically, dynamic back plane 34 comprises DVI Video port 120, 10/100 Ethernet port 124, USB ports 128 and 132, SATA bus ports 136 and 140, power button 144, and power port 148. A proprietary universal port is also contemplated that is used to electrically couple two processing control units together to increase the processing capabilities of the entire system and to provide scaled processing as identified and defined herein. One ordinarily skilled in the art will recognize the various ports that may be utilized with the processing control unit of the present invention.

It should be noted that in an exemplary embodiment, the design and geometric shape of encasement module 10 provides a natural indentation for the interface of these ports. This indentation is shown in FIG. 7. Thus, inadvertent dropping or any other impacts to processing control unit 2, and encasement module 10, will not damage the system as these ports are protected via the indentation formed within the dynamic back plane. First and second end caps 46 and 50 also help to protect the system from damage.

Power button 144 has three states—system on, system off, and system standby for power boot. The first two states, system on and system off, dictate whether processing control unit 2 is powered on or powered off, respectively. The system standby state is an intermediary state. When power is turned on and received, the system is instructed to load and boot the operating system supported on processing control unit 2. When power is turned off, processing control unit 2 will then interrupt any ongoing processing and begin a quick shut down sequence followed by a standby state where the system sits inactive waiting for the power on state to be activated.

In this preferred embodiment, processing control unit 2 also comprises a unique system or assembly for powering up the system. The system is designed to become active when a power cord and corresponding clip is snapped into the appropriate port located on dynamic back plane 34. Once the power cord and corresponding clip is snapped into power port 148 the system will fire and begin to boot. The clip is important because once the power source is connected and even if the power cord is connected to the leads within power port 148, processing control unit 2 will not power on until the clip is snapped in place. Indicators may be provided, such as on the monitor, that warn or notify the user that the power cord is not fully snapped in or properly in place.

SATA bus ports 136 and 140 are designed to electronically couple and support storage medium peripheral components, such as CD-ROM drives, and hard drives.

USB ports 128 and 132 are designed to connect peripheral components like keyboards, mice, and any other peripheral components, such as 56 k modems, tablets, digital cameras, network cards, monitors, and others.

The present invention also contemplates snap-on peripherals that snap onto dynamic back plane and couple to the system bus of processing control unit 2 through a snap on connection system. As stated, other ports and means for connecting peripheral or input/output devices may be included and incorporated into processing control unit 2 as recognized by one skilled in the art. Therefore, the particular ports and means for connecting specifically identified and described herein are intended to be illustrative only and not limiting in any way.

Figure 8:
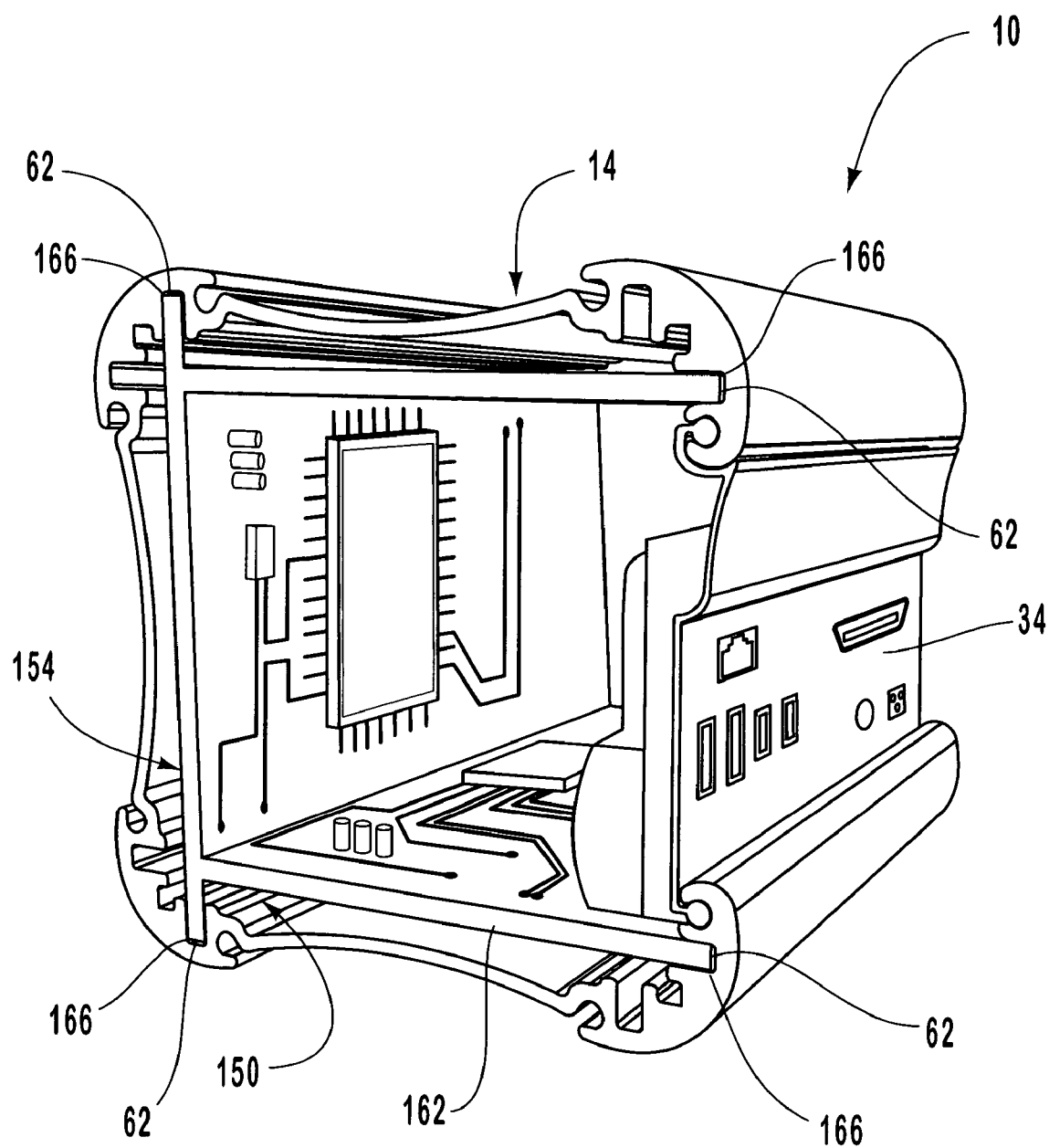
FIG. 8 illustrates the tri-computer circuit board configuration as coupled to or fit within the main support chassis of the non-peripherals computer encasement according to one embodiment of the present invention.

With reference to FIG. 8, the present invention processing control unit 2 comprises a proprietary computer processing system 150, with encasement module 10 comprising a unique design and structural configuration for housing processing system 150 and the electrical printed circuit boards designed to operate and be functional within processing control unit 2.

Essentially, processing system 150 includes one or more electrical printed circuit boards, and preferably three electrical printed circuit boards, oriented and formed in a tri-board configuration 152 as shown in FIG. 8. Processing system 150, and particularly tri-board configuration 152, comprises first electrical printed circuit board 154, second electrical printed circuit board 158, and third electrical printed circuit board 162 coupled to and housed within encasement module 10 as shown. Processing system 150 further comprises at least one central processor and optionally one or more other processors designed to perform one or more particular functions or tasks. Processing system 150 functions to execute the operations of processing control unit 2, and specifically to execute any instructions provided on a computer readable media, such as on a memory device, a magnetic hard disk, a removable magnetic disk, a magnetic cassette, an optical disk (e.g. hard drives, CD-ROM's, DVD's, floppy disks, etc.), or from a remote communications connection, which may also be viewed as a computer readable medium. Although these computer readable media are preferably located exterior to or without processing control unit 2, processing system 150 functions to control and execute instructions on such devices as commonly known, the only difference being that such execution is done remotely via one or more means for electrically connecting such peripheral components or input/output devices to processing control unit 2.

First, second, and third electrical printed circuit boards 154, 158, and 162 are supported within main support chassis 14 using means for engaging or coupling or supporting electrical printed circuit boards. In the embodiment shown in FIG. 8, means for engaging electrical printed circuit boards comprises a series of board receiving channels 62 located in each junction center of encasement module 10. Board receiving channels 62 are adapted to accept an end portion 166 of an electrical printed circuit board. Several orientations may exist for placing electrical printed circuit boards within encasement module 10, but preferably end portion 166 of first electrical printed circuit board 154 fits within board receiving channel 62 located adjacent first wall support 18. End portions 166 of second and third electrical printed circuit boards 158 and 162 fit in a similar manner within board receiving channel 62 located adjacent second and third wall supports 22 and 26, respectively, to comprise the orientation as shown in FIG. 8.

Tri-board main board configuration 152 and printed circuit boards are not supported by and preferably do not rest upon any of the wall supports of primary chassis 14. Each of the electrical printed circuit boards are specifically supported within primary chassis 14 by board receiving channels 62 located within the junction centers. Primary chassis 14 is designed this way to provide a gap or space between each of the electrical printed circuit boards and the opposing wall supports to allow for the proper airflow within processing control unit 2 according to the unique natural convection cooling properties provided herein. As such, each radius of curvature calculated for each wall support is designed with this limitation in mind.

Tri board main board configuration 152 provides significant advantages over prior art board configurations. As one advantage, tri-board configuration 152 is configured in three multi-layer main boards instead of one main board as found in conventional computer systems. In addition, less real estate is taken up as the boards are able to be configured within different planes.

Another advantage is in the way two of the main boards couple to a third main board. By coupling each of the first, second, and third electrical printed circuit boards 154, 158, and 162 together in this manner, the chance for detachment of each of these boards from their proper place within primary chassis 14 and encasement module 10 is significantly decreased. In virtually any circumstance and condition or environment processing control unit 2 is exposed to, tri-board configuration 152 will remain intact and in working order, thus maintaining or preserving the integrity of the system. This is true even in impact and applied loading situations.

Preferably, first and third electrical printed circuit boards 154 and 162 are attached to third electrical printed circuit board 158 during manufacture and prior to tri-board configuration 152 being placed within encasement module 10. Once tri-board configuration 152 is assembled it is inserted into and secured to main support chassis 14 as shown. It should be noted that not all of board receiving channels 62 are necessarily utilized.

FIG. 8 illustrates the preferred embodiment, wherein only four of these channels are used to support the respective end portions of the electrical printed circuit boards. However, FIG. 8 is only illustrative of a one exemplary embodiment. Other configurational designs for processing system 150 are contemplated. For example, processing control unit 2 could comprise one board only, or two or more boards. Moreover, processing system 150 may comprise a layered design configuration, in which the included printed circuit boards exist in a multi-planar configuration. One skilled in the art will recognize the several configurations and possibilities.

Figure 14A:
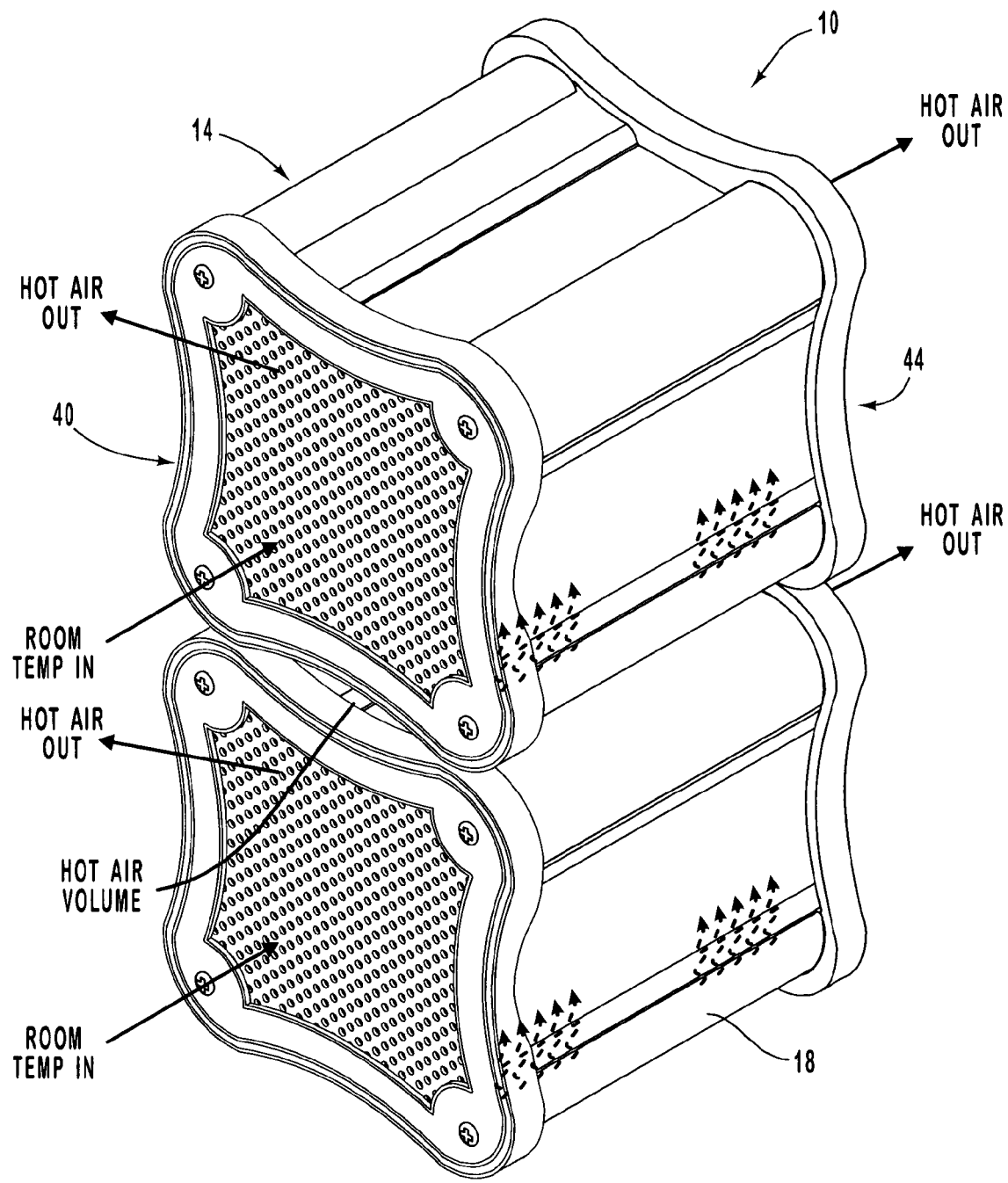
FIG. 14-A illustrates the modular capabilities of the processing control unit of the present invention and the dissipation of heat between two such units.
Figure 14B:
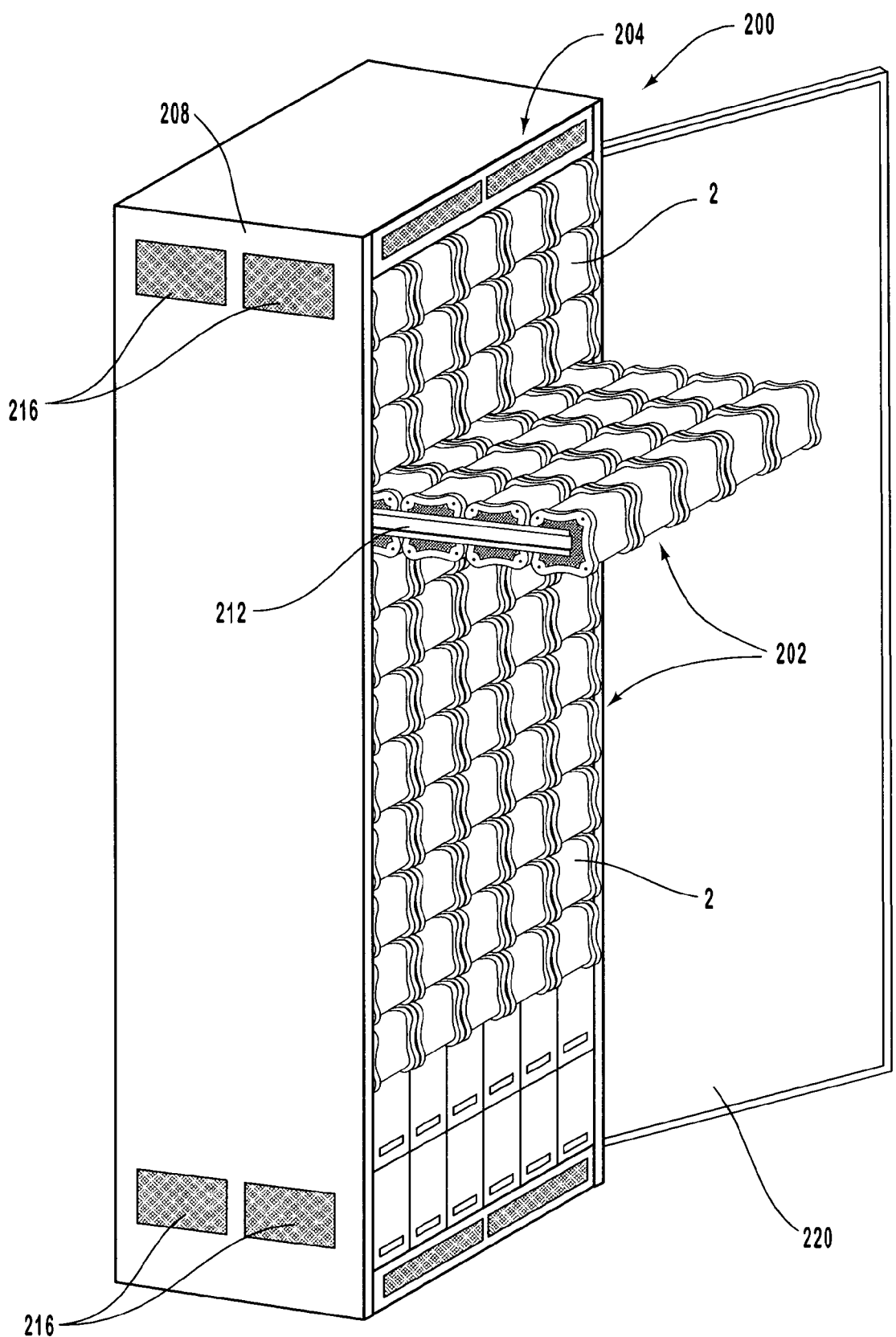

Referring to FIGS. 14A and 14B, the present invention further features a system and method for providing modular or scaled computer processing by process coupling two or more processing control units together to function as a single processing unit, as shown in FIG. 14A. This essentially means that two or more processing units may be coupled together, such that the sum or combined processing power of the two process-coupled units is greater than the individual processing power of a single unit. Stated differently, the present invention allows two or more processing control units 2 to be process-coupled together to produce a combined processor, wherein each individual processor functions with the other as a single, integrated processing unit. Essentially, although processing control unit 2 may be used as a stand alone unit, it is contemplated, and a significant advantage of the present invention, that several units will be process-coupled together as a cluster, as shown in FIG. 14B, wherein an advantage of what may be termed as "scaled processing" is achieved. Specifically, FIG. 14B illustrates multi-plex processing center 200 (shown as a tower) that comprises a cluster or a plurality (shown as cluster 202) of individual processing control units 2, each processed coupled together and mounted within multi-plex processing center 200. Each individual processing control unit is mounted using means for mounting, which comprises, in one exemplary embodiment, rack system 212. Rack system 212 further comprises engagement means thereon to physically and removably couple each processing control unit 2. Engagement means preferably comprises a mounting bracket designed to fit within and engage slide receivers 82 located on each wall support of main support chassis 14 of encasement module 10. As shown, it is contemplated that any number of processing control units 2 may be processed coupled together to achieve scaled processing power in a very limited amount of space.

Scaled processing may be defined as the overall processing ability of a cluster of processing control units 2. Moreover, scaled processing power is directly proportional to the number of units electrically process-coupled together.

As a multi-plex center is not always desirable, two or more processing units 2 may nonetheless be process-coupled together using means for coupling encasement module 10 or primary chassis 14 to an external member as identified above, or means for engaging an external member, which means serve to physically couple the two units together. Once physically connected, the two or more units are electrically connected through the universal port. The universal port electrically connects the processing components of one unit to the processing components of another unit. However, or alternatively, two or more processing control units 2 may still be process-coupled together without requiring them to be physically coupled to each other as process coupling two or more processing control units 2 together is a matter of electrically, rather than physically, connecting two units together. As such, two or more processing units may be process coupled using a wired or wireless connection.

As mentioned, each processing control unit 2 comprises a proprietary universal port, which functions to electrically connect or process couple two or more processing control units together. Once electrically process-coupled through this proprietary port, the combined connected processing control units function as a single processor, only having much greater processing power than any individual unit. Thus, it follows that the more units that are process-coupled together, the greater the overall processing power of the system.

FIG. 14A further illustrates the heat dissipating properties of two or more processing control units process-coupled together. In a process-coupled relationship, the dissipation of thermal discharge functions in a similar manner as described above. However, in a cluster, such as that shown in FIG. 14B, it may be necessary to provide means for circulating ambient air between units to replace or renew or recirculate the ambient air after it is heated and discharged from each processing unit 2.

Another significant advantage of the present invention is that encasement module 10 comprises a full metal chassis or a main support chassis 14 that provides for very little or no radiation emission in the form of electromagnetic interference (EMI). This is in large part due to the material properties, the small size, the thickness of the structure, and the close proximity of the processing components in relation to the structural components of encasement module 10. Whatever EMI is produced by the processing components is absorbed by encasement module 10, no matter the processing power of the processing components.

Still another advantage is the fact that encasement module 10 provides for a much cleaner, more sterile interior than prior art computer encasement designs. Because of the design of encasement module 10, particularly the small size and the heat dissipating properties, it is very difficult for dust particles and other types of foreign objects to enter the encasement. This is especially true in a liquid cooled model, wherein the entire encasement is sealed. A more sterile interior is important in that various types of foreign objects or debris can damage the components of and/or reduce the performance of processing control unit 2.

Although processing control unit 2 relies on natural convection in one exemplary embodiment, the natural influx and efflux of air during the natural convection process significantly reduces the influx of dust particles or other debris into processing control unit 2 because there is no forced influx of air. In the natural convection cooling system described herein, air particles enter the interior of encasement module 10 according to natural principles of physics, and are less apt to carry with them heavier foreign object as there is less force to do so. This is advantageous in environments that contain such heavier foreign objects as most environments do.

The unique cooling methodology of processing control unit 2 will allow it to be more adaptable to those environments prior related encasements were unable to be placed within.

Still another advantage of the present invention processing control unit 2 is its durability. Because of its compact design and radius-based structure, encasement module 10 is capable of withstanding large amounts of impact and applied forces, a feature which also contributes to the ability for processing control unit 2 to be adaptable to any type of conceivable environment. Encasement module 10 can withstand small and large impact forces with little effect to its structural integrity or electrical circuitry, an advantage that is important as the small size and portability of processing control unit 2 lends itself to many conceivable environments, some of which may be quite harsh.

In addition to the structural components of encasement module 10 being very durable, the electrical printed circuit design board and associated circuitry is also extremely durable. Once inserted, the printed circuit boards are very difficult to remove, especially as a result of inadvertent forces, such as dropping or impacting the encasement. Moreover, the boards are extremely light weight, thus not possessing enough mass to break during a fall. Obviously though, encasement 10 is not entirely indestructible. In most circumstances, encasement module 10 will be more durable than the board configurations, therefore the overall durability of processing control unit 2 will be most likely limited by the board configuration and the circuitry therein.

In short, encasement module 10 comprises a high level of durability not found in prior related encasement designs. Indeed, these would break, and often do, at very slight impact or applied forces. Such is not so with processing control unit 2 described herein.

The durability of encasement module 10 is derived from two primary features. First, encasement module 10 is preferably built with radiuses. Each structural component, and their designs, are comprised of one or more radiuses. This significantly adds to the strength of encasement module 10 as a radius-based structure provides one of the strongest designs available. Second, the preferred overall shape of encasement module 10 is cubical, thus providing significant rigidness. The radius-based structural components combined with the rigidness of the cubical design, provide a very durable, yet functional, encasement.

The processing control unit of the present invention further features the ability to be mounted to, or to have mounted onto it, any structure, device, or assembly using means for mounting and means for engaging an external member (each preferably comprising slide receiver 82, as existing on each wall support of main support chassis 14). Any external member having the ability to engage slide receivers 82, as well as a host object to which processing control unit 2 is to be mounted, is contemplated for protection herein. In addition, one skilled in the art will recognize that encasement module 10 may comprise other designs or structures as means for engaging an external member other than slide receivers 82.

Essentially, the significance of providing mountability to processing control unit, no matter how this is achieved, is to be able to integrate processing control unit 2 into any type of environment as discussed herein, or to allow various items or objects to be coupled or mounted to processing control unit 2. The unit is designed to be mounted to various inanimate items, such as multi-plex processing centers or transportation vehicles, as well as to receive various peripherals mounted directly to processing control unit 2, such as a monitor or LCD screen.

The mountability feature is designed to be a built-in feature, meaning that processing control unit 2 comprises means for engaging an external member built directly into its structural components. Both mounting using independent mounting brackets (e.g. those functioning as adaptors to complete a host-processing control unit connection), as well as mounting directly to a host (e.g. mounting the unit in a car in place of the car stereo) are also contemplated for protection herein.

Another capability of processing control unit 2 is its ability to be mounted and implemented within a super structure, such as a Tempest super structure, if additional hardening of the encasement module is effectuated. In such a configuration, processing control unit 2 is mounted within the structure as described herein, and functions to process control the components or peripheral components of the structure. Processing control unit 2 also functions as a load bearing member of the physical structure if necessary. All different types of super structures are contemplated herein, and can be made of any type of material, such as plastic, wooden, metal alloy, and/or composites of such.

The present invention features a method for integrating or incorporating a proprietary processing control unit into any conceivable system, device, assembly, apparatus, or object (collectively referred to as "an item") to introduce intelligence into the item. By doing so, the item essentially becomes or is transformed into a "smart" item. This unique feature is not found in conventional prior related computing devices and is made possible as a result of the combination of design, structural, and processing capabilities of processing control unit 2. In one exemplary embodiment, processing control unit 2 is allowed to function in these various environments due to the "slide-on" or "snap-on" capabilities of processing control unit 2. By "slide-on," and "snap-on" it is meant that processing control unit 2 may accept various brackets, mounts, devices, etc. by sliding or snapping them into a suitable acceptor or receiver, respectively, located on processing control unit 2, such as slide receivers 82. In addition, an entire processing control unit 2 may be slid or snapped into another structure using the same receivers. Essentially, the present invention provides means of allowing processing control unit 2 to accept different peripheral items, or to be incorporated into another structure. In other embodiments, the particular methods and/or systems employed to mount the processing control unit to an external member may be those well known in the art.

Although it is contemplated that the processing control unit of the present invention will be adaptable to any conceivable environment, one of its primary functions will still be to function as a normal computer system or workstation for the home or office. In a home or office setting, the processing control unit provides the ability to free up much needed space, to be camouflaged, or to be hidden from view altogether. The size and weight of the unit make it very portable and easy to move around, as well as providing space benefits not available with prior related computer encasements.

In addition, due to the processing control unit's ability to process couple to another processing control unit to achieve scaled processing, conventional computer systems, such as those built for the telecommunications industry, can be eliminated. For example, instead of housing several servers in a building at a telecommunications tower as is currently the practice, a plurality of processing control units of the present invention can be process-coupled together and mounted directly to the tower, wherein they are capable of providing the same amount of, if not more, processing power as prior art servers.

As another example, the processing control unit may be mounted on the inside or outside of a house or other structure or building to be used to deploy 802.11x networks or smart home technology right into the house or building structure, such as for the purpose of providing and controlling various appliances, thus transforming them into "smart" appliances.

Processing control unit 2 may also be used as an acceptable omni-directional and/or directional antenna for hardwire networking systems or wireless networking standards, such as 802.11a, 802.11b, and blue tooth. This is made possible through its preferable metal design and ability to be adaptable to be placed in various environments where it may receive and capture a transmission signal.

Processing control unit 2, and particularly first, second, and third insert members 66, 70, and 74, may also be designed and adapted to perform other functions. For example a light slide may be utilized to act as a wiring harness supplying power and data to other slide-on pieces.

Method and System for Dissipating Thermal Discharge from the Processing Control Unit The present invention features a unique system and method for improving the thermodynamics of a computer encasement, and particularly for dissipating heat from the interior of processing control unit 2 as described above. Under normal operation, it is common for a processing control unit to generate and discharge high levels of thermal activity, which is generally in the form of heat. If allowed to reach elevated temperatures beyond what they are able to bear, the processing components and the circuitry existing within the processing components literally burn up and become dysfunctional. As such, it is necessary to provide adequate means for cooling the processing and other components of the computer directly, or the computer interior in general, or means for dissipating heat from the interior of the computer, in order to keep temperatures within the computer and at the processing components within an acceptable range. The present invention provides improved heat dissipating capabilities. By improving the cooling in the encasement, the operation and function of the processing components likewise improves, thus increasing the longevity of the computer processing system.

In most prior art designs means for cooling or means for dissipating heat comprises a type of fan or blower device designed to cause the air within the computer to circulate, wherein the hot air is blown out of the encasement through a vent and replaced by cooler air allowed to enter into the encasement through the same or a different vent or through the creases between the walls and top and bottom portions of the encasement as these are not typically sealed or airtight.

The present invention preferred system for dissipating heat from processing control unit 2 comprises means for dissipating heat through a natural convection system, and the preferred method of dissipating heat from processing control unit 2 is accomplished using natural convection. In an alternative embodiment, the method and system for dissipating heat comprises a liquid cooling system. Each of these systems and their corresponding methods are described in detail below.

As stated above, prior art conventional computer systems are cooled using some type of cooling device or system, such as a fan, that operates to displace and circulate the heated air within the interior of the computer encasement so it can escape to the outside. Due to its size and calculated design, processing control unit 2 is capable of dissipating heat from the interior and maintaining an optimal operating environment for the processing components contained therein, without requiring the use of a mechanical device or system. Instead, the processing control unit of the present invention is capable of utilizing natural convection to cool each of the processing components, circuitry, and any other components that exist within processing control unit 2, and that generate heat or are in need of cooling. It should be noted here that although removal of all conventional cooling systems and devices is preferred, these conventional systems and devices may be incorporated into processing control unit 2, if so desired. One ordinarily skilled in the art will recognize the situations and environments in which these systems and/or devices may be desirable.

As no mechanical devices or systems are preferably present in processing control unit 2, as in prior art designs, the overall user experience is made more pleasant. First, the design of the unit results in little or no noise being produced, thus providing decreased acoustics and reducing overall noise pollution in the settings in which it is placed. The operation of processing control unit 2 is virtually inaudible to the user as there is no fan or other blower to produce the annoying constant hum or sound common to prior art systems. Second, processing control unit 2 functions as a natural noise dampener. Any sounds that do emanate from the unit are muffled. The design of the unit lends itself to reduced reverberation, meaning that any sounds produced are absorbed by the elements of the unit. Specifically, the curvature of the individual components of the unit serve to muffle, alter, or absorb any sounds coming from the unit. This is largely in part due to the curvature within the components. As there are minimal to no flat surfaces, sound is not easily reflected, but instead absorbed. Whatever sounds are produced, the end planes are going to reflect the noise back into encasement module 10 and into one of the side wall supports, which comprise an identified curvature that will naturally drive the noise up and into the corners and into the most solid part of encasement module 10 where they will be deadened. Third, in some embodiments, there is a reduction of expelled heated air being blown into the ambient surrounding air creating undesirable heat. Fourth, there is no chance of mechanical breakdown or malfunction as there are preferably no moving parts therein. Fifth, as there are no moving parts, and as the unit is virtually inaudible, these features lend to the ability of the unit to be morphed into various inanimate objects. If mechanical cooling were required, this would not be possible because the object would produce an unwanted audible sound.

By design, processing control unit 2, comprises several thermal properties that are a direct result of, or are inherently made possible through, the specific design of encasement module 10 and tri-board configuration 150 fitting therein, the combination of which enable processing control unit 2 to be cooled or to dissipate thermal discharge, or heat, from its interior using natural convection. These thermal properties are discussed in turn below in relation to FIGS. 9–13, which merely illustrate one exemplary embodiment.

Figure 9:
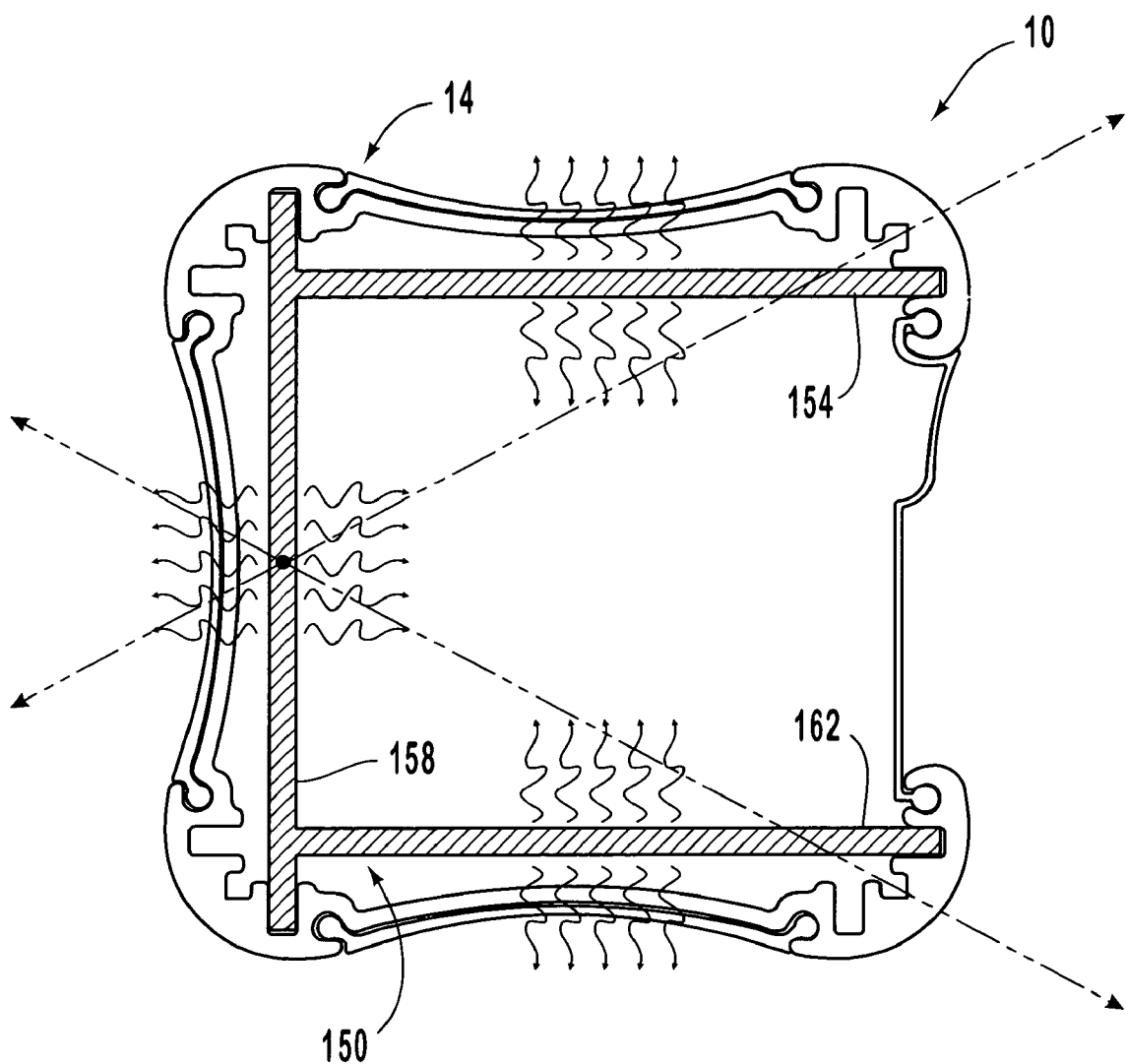
FIG. 9 illustrates the primary heat radiating areas of the present invention tri-computer circuit board configuration and the general direction of air flow away from these circuit boards as existing within the encasement.

With reference to FIG. 9, shown is encasement module 10, and particularly primary support module 14, having tri-board configuration 150 comprising first, second, and third electrical printed circuit boards 154, 158, and 162, respectively, coupled therein in the relationship as described above. Under normal operating conditions, electrical printed circuit boards 154, 158, and 162 produce significant amounts of thermal discharge from their surfaces. This thermal discharge, which results from the activity of the processing components and the circuitry used to connect these components, exists in the form of heat and is represented by the arrows stemming from each side of electrical printed circuit boards 154, 158, and 162. As can be seen, electrical printed circuit boards 154, 158, and 162 are offset a distance from each of the wall supports in primary chassis 14, such that a gap or space is created. This gap allows air to naturally circulate therein according to the heat dissipating properties as described herein.

Also, as can be seen, each of wall supports 18, 22, and 26 comprise a concave shape, thus facilitating the transition of heated air from the center of each respective wall support to the corners of encasement module 10. Therefore, as electrical printed circuit boards 154, 158, and 162 generate or produce heat, or rather heat the air adjacent their surfaces, the heated air will contact the inner surface of each wall support and will naturally move towards the respective corners as a result of the concave shape of each wall support and the fact that the heated air will take the path of least resistance.

By design, there is more material in the corners of encasement module 10. This is provided because the wall supports, with their curvatures, act like fins and transfer the heat to the corner, which may be considered a heat center. Therefore, there is a greater amount of thermal transfer taking place at the corners, which is also by design. This keeps as much heat as possible away from the electrical printed circuit boards contained within encasement module 10. Further details of how the air is dissipated from the interior are discussed in relation to FIGS. 11–13 below.

FIG. 9 also illustrates two additional thermal properties of encasement module 10, the first being the central point of thermal discharge, which may be defined as the point or area within the interior of encasement module 10 having the greatest concentration of thermal discharge. This concentration comprises the combined thermal discharge generated or produced from each individual electrical printed circuit board 154, 158, and 162. The central point of thermal discharge is located substantially near the center portion of and proximate electrical printed circuit board 158 as shown. A second thermal property of encasement module 10 illustrated by FIG. 9 is that the quantity and concentration of thermal discharge lessens moving away from electrical printed circuit board 158 and towards the distal ends of electrical printed circuit boards 154 and 162. This particular thermal property of processing control unit 2 is represented by the crossing dotted lines, which shows that the thermal activity tapers off towards those ends of electrical printed circuit boards 154 and 162 that are distal to electrical printed circuit board 158. The crossing lines represent what may be termed as the distribution of radiated heat. Although each electrical printed circuit board 154, 158, and 162 each produce equivalent amounts of thermal discharge, the concentration of such is obviously greatest where the three intersect.

Figure 10:
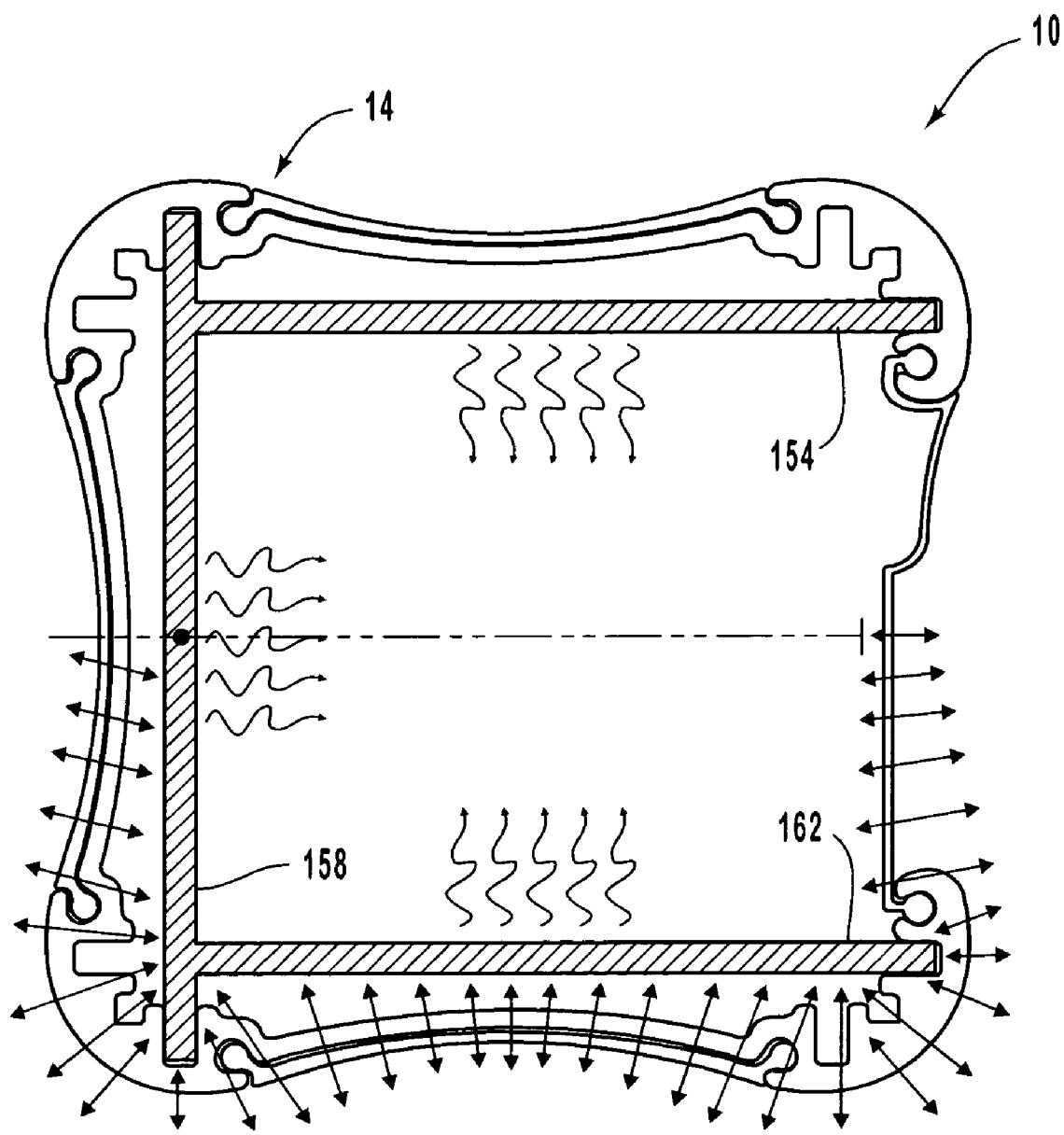
FIG. 10 illustrates the natural convection heat dissipating characteristics of the present invention non-peripherals computer encasement used to cool the tri-board configuration and generally the interior of the computer encasement according to one embodiment of the present invention.

With reference to FIG. 10, shown is encasement module 10 and an additional significant thermodynamic property. The ability of encasement module 10 to utilize natural convection can be taken a step further. Because of its size, encasement module 10 allows ambient air to flow into and out of the interior without getting trapped where it can get heated. Instead of trapping air in an encasement because of its large size, having to cool the trapped air after it has become heated, and then purging the trapped heated air, as is the process in prior art computer encasements, the present invention method and system for dissipating heat allows ambient air to naturally flow in and out of encasement module 10 virtually undetected. This is accomplished as a result of the size of the encasement relative to the computer components (e.g., processing components) existing within the processing control unit. Specifically, the encasement module preferably comprises an enclosure boundary that is less than the volume of air particles heated by the thermal radiation output by the contained computer components. Stated differently, each computer component outputs a certain amount of thermal radiation, which heats surrounding and adjacent air particles. This radiation can only extend so far, or rather, only so many surrounding air particles are heated due to the amount of thermal radiation produced. As such, the volume of heated air particles is directly proportional to the amount of thermal radiation produced by the computer components. If the encasement module is designed so that its enclosure boundary is smaller than the volume of heated air particles, then airflow will be continuous during operation (heat will rise and flow following the least path of resistance). In addition, the potential for trapped air will be reduced and/or eliminated because the heated air will continuously be forced out of the encasement as a result of its design. As such, the particular size of the encasement module 10 is important to the natural cooling of the processing control unit.

To explain in greater detail the specific function, encasement module 10 comprises a small enough size, wherein the interior volume of space within encasement module 10 is significantly reduced compared to prior art designs, such that advantage of outside ambient air may be taken advantage of to provide natural cooling. Encasement module 10 functions much like a heat pump or heat sink, wherein ambient air at room temperature, represented by the several arrows in FIG. 10, is allowed to enter into the bottom portion of encasement 10, defined by the dotted line extending across the middle section of encasement 10 as illustrated in FIG. 10, to cool the processing components contained therein. Prior art designs also use ambient air to cool their components as that is sufficient. Indeed, additional cooling elements are rarely needed. However, as in prior art designs, if the inside volume of space of the encasement is too great, it becomes like a separate isolated room because the air allowed to enter the interior gets trapped therein. Suddenly there is too much ambient air inside the encasement that is heated by the processing components and then stuck at the top of the encasement. There would essentially be too much air within the encasement to allow the air to cool the interior on its own. This is why various mechanical cooling devices, such as fans, must be placed within these types of encasements—to purge the heated air so that the temperature of the air inside the encasement does not rise to the level where the processing components would not be capable of functioning. Stated another way, processing components are capable of putting off enough heat that if the air were allowed to rise to that level then the processors would burn up and become inoperable.

Therefore, unlike prior art systems or designs that comprise a large interior volume of space and that essentially "trap" air inside the encasement where it must be cooled and purged, encasement module 10 comprises a small enough volume of space so that air is not trapped therein, but is allowed to enter at ambient room temperature and exit at almost that same temperature because it is not trapped within the interior where it would normally be heated. In essence, encasement module 10, because of its size, is able to allow hot air to escape to the outside using natural convection. The internal temperatures of encasement module 10 may fluctuate depending upon the number of internal components used, but not enough to have an effect upon the operations of the processing or other components.

Encasement module 10 comprises natural heat dissipating properties that allow the processing components therein to be cooled almost as if there were no encasement structure present at all. In addition, the impact of heated air exiting the interior of encasement module 10 on the surrounding air temperature is practically negligible because the air is not being forced out using a fan or other similar device as prior art encasement modules. Moreover, there is normally enough ambient room temperature air allowed to mix with the air circulated through encasement module 10 so that any heated air coming out of encasement module 10 will immediately be mixed with the ambient air.

It should be noted that the particular size and shape of processing control unit may vary, and still perform the intended functions of the present invention. Thus, encasement module may be designed to comprise various geometric sizes, dimensions, and shapes. What is desired to be secured herein is one unique way of dissipating thermal discharge from a computer encasement using natural convection. As such, the particular processing control unit illustrated in the figures, and described in detail herein, is merely intended as one exemplary embodiment. Through similar design and construction, one ordinarily skilled in the art will recognize the many other designs that may be constructed, and still possess the physical, thermal, and functional properties as discussed herein. For example, a processing control unit may comprise a spherical, triangular, conical, cylindrical, or any other conceivable shape. In addition, processing control unit may comprise a larger or smaller size as long as it is capable of preserving the functions described herein. The present invention also contemplates and is intended to cover various ranges of performance, although not necessarily optimal. For example, a processing control unit may comprise a larger or smaller size, wherein the temperature differential between the interior of the encasement and the surrounding ambient air is not substantially the same (compared to the almost negligible differential found in the processing control unit 2 discussed above) as the ability to perform heat dissipation through natural convection may be potentially decreased.

Figure 11:
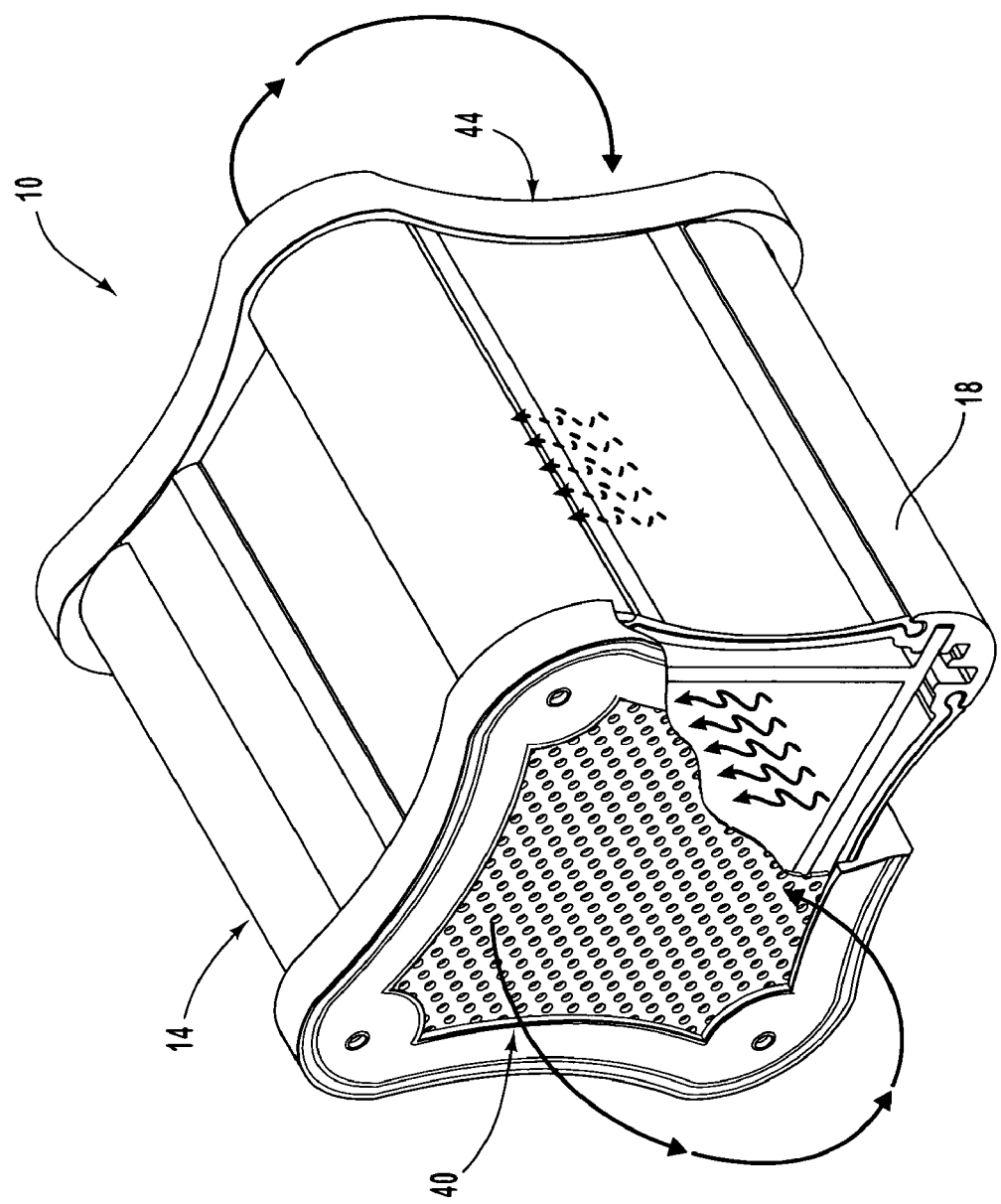
FIG. 11 illustrates the natural flow of air through the computer encasement as dictated by its specific design according to one embodiment of the present invention.
Figure 12:
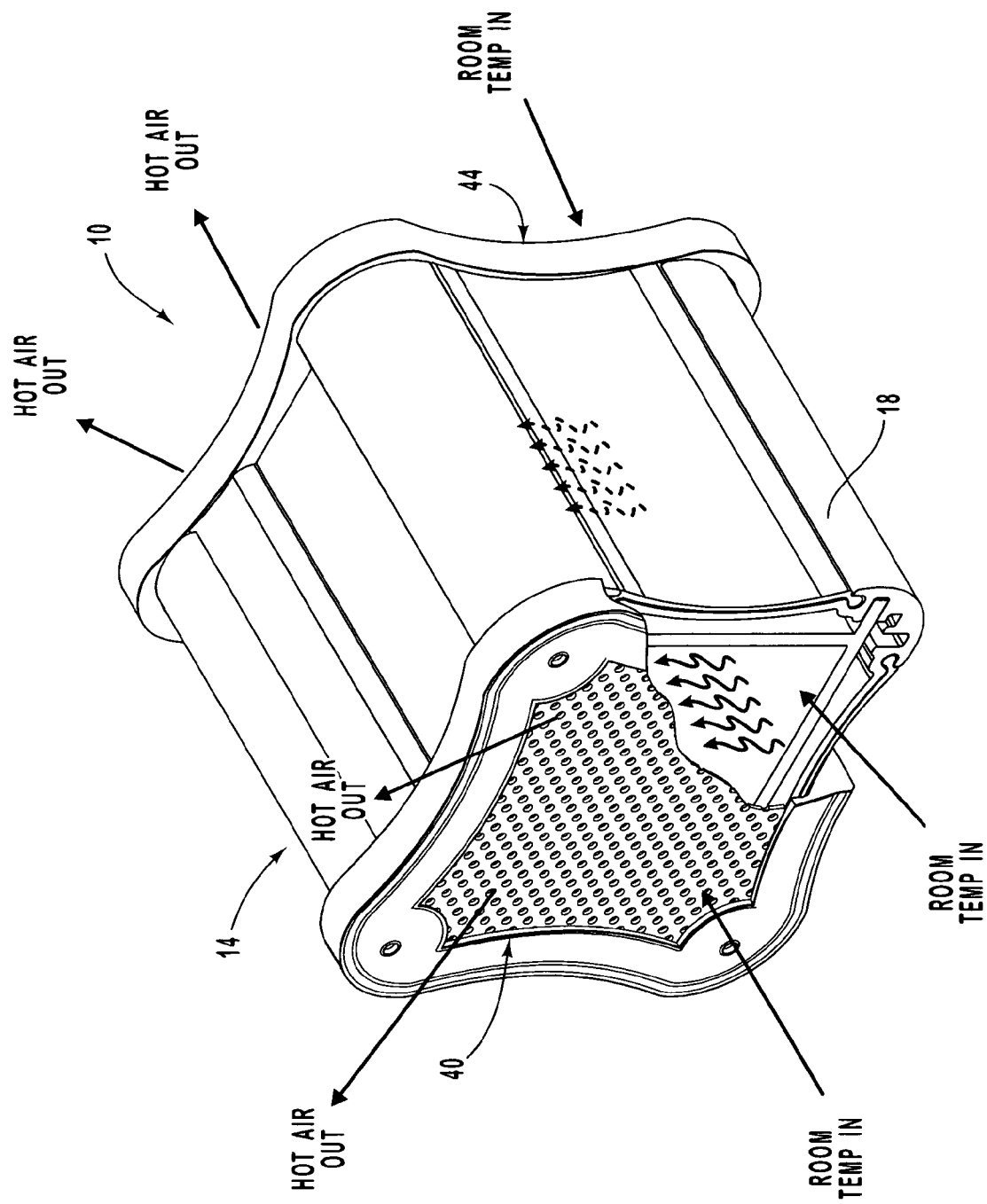
FIG. 12 illustrates another view of the natural air flow through the encasement as shown in FIG. 11.
Figure 13:
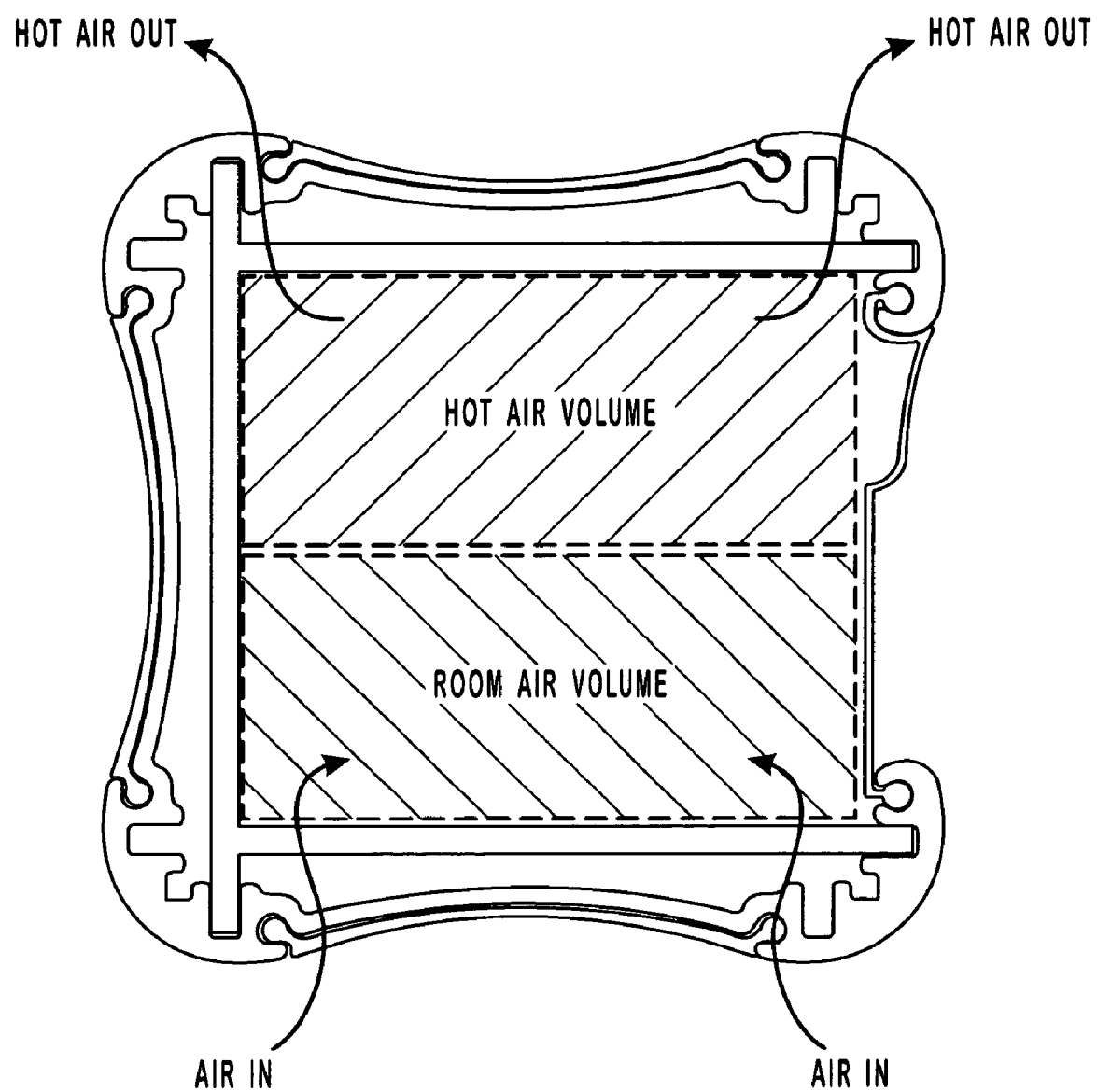
FIG. 13 illustrates the two existing segmented volumes of air inside the interior of the encasement and the compression theory used to drive high temperature air out of the encasement according to one embodiment of the present invention.

FIGS. 11–13 illustrate how this thermal property of natural convection is performed. As shown, when powered on and during operation of processing control unit 2, there is a natural influx of ambient air or air particles into encasement module 10 through ventilation ports 98 located at first and second end portions 40 and 44 as the processing components inside encasement module 10 heat up. By design, air is allowed to exist and flow between the processing components and wall supports of encasement module 10.

The natural influx of ambient air particles are ultimately exposed to the surfaces of the processing components within encasement module 10. During normal operation, and as these processing components proceed in their function, they generate high levels of thermal activity or discharge in the form of heat. This heat rises or radiates from the surfaces of the processing components and heats the air particles directly or immediately adjacent their surfaces. As the air is heated, it conforms to natural principles of physics, wherein its particles expand and begin to rise. As stated, one of the primary functions of the concave shape of wall supports 18, 22, and 26 of encasement module 10 is to provide a physical path for the heated air to follow. Thus, the rising air, as it wants to follow the path of least resistance, will follow the natural contour of encasement module 10. As shown in FIGS. 9 and 10, wall supports 18, 22, and 26 comprise a concave structure, wherein a gap or space is created between these and the processing components, such as electrical printed circuit boards 154, 158, and 162. By building encasement module 10 with concave side wall supports, a physical path for the natural flow of air is created. At the middle of each side wall support 18, 22, and 26 the space or gap between these wall supports and electrical printed circuit boards 154, 158, and 162, respectively, is the smallest. It is at this point or location that the principle of natural compression of air occurs. Specifically, the gap distance at the ends of the wall supports is greater than the gap distance at the center, thus lending to another thermal property of processing control unit 2, wherein natural compression of air is utilized to aid in the influx and efflux of air through processing control unit 2. In addition to convection, processing control unit 2 also utilizes conduction to contribute to the heat dissipating properties of processing control unit 2. As air is heated, the structural components of encasement module 10, namely wall supports 18, 22, and 26, as well as end plates 38 and 42, are also heated. As the air enters the interior of encasement module 10, is heated, and begins its path upwards, those heated air particles coming in contact with the structural components of encasement module 10, as identified, will tend to transfer, through conduction, as much energy in the form of heat to these structural components as possible. Heating the structural components, particularly at the bottom of encasement module 10 where the concentration of heat is the greatest, further contributes to the natural compression of the air particles and further facilitates their flow because the composition of these structural components, namely their aluminum composition, functions to produce basically an air-to-air transfer. As such, the present invention processing control unit comprises a two-tiered cooling or heat dissipating system—a first natural convection cooling system and a second conduction cooling system. These two function together to provide natural cooling or heat dissipation to processing control unit 2. However, it should be noted that the process of natural convection is sufficient to cool processing control unit 2, even if made of other materials, such as plastic. A plastic case, although acting more as an insulator than a conductor, actually contributes to the overall heat dissipation of the unit because all heat generated by the processing components is transferred through convection to the air particles within the unit instead of a portion of it transferring, through conduction, to the structural components where it can be trapped for a time. However, using plastic increases the electromagnetic interference (EMI) produced. Thus, using plastic would best be suited in a liquid-cooled model where metal liners could be used to reduce the EMI without creating an enclosed insulator.

To illustrate the natural convection process in greater detail, as air particles enter through ventilation ports 98, they will do so at the bottom. This is because as the air enters, it is heated by the thermal discharge generated from the processing components. Those air particles that are heated expand and begin to rise through the gap or space provided by the physical structure of encasement module 10. In addition, as the air particles rise, they naturally will follow the concave path provided by wall supports 18, 22, and 26. As they continue to rise, the gap or space decreases until the heated air particles are compressed into the center portion where the gap is the smallest (see FIG. 10). As they are compressed, their velocity is increased. Thus, they exit this particular section or gap at an increased rate of speed than when they entered. This natural compression of air is a result of the design of encasement module 10, as well as the physical properties of fluid flow according to naturally occurring principles of physics.

Once compressed and comprised of an increased velocity, the air particles, due to the fact that they are heated and compressed, will continue to rise. As they do, they come in contact with the upper portion or upper wall of encasement module 10, which is also comprises a concave design. As they contact this upper wall, the concave structure forces the air particles to the outside corners, as this is the path of least resistance, where they ultimately exit encasement module 10 through those ventilation ports 98 located near the top or upper section end plates 38 and 42 of processing control unit 2. As the heated air leaves, room temperature ambient air is sucked into encasement module 10 to replace the air particles purged. As operation of processing control unit 2 continues, this process—namely the influx of air into encasement module 10 near the bottom, allowing the air to become heated from the thermal discharge generated from the processing components, providing a natural flow path for the air as it rises, compressing the air to increase its velocity, manipulating the air to the outside edges and corners, and causing the air to exit to the surrounding ambient air, is continuously repeated over and over, wherein a natural circular pattern of air flow is created. This natural circular air flow pattern is natural convection at work and is represented by the circular arrows in FIG. 11, where one air flow pattern is clockwise and the other is counter-clockwise as shown. As such, processing control unit 2 utilizes compression, and namely the natural compression of air, to perform the thermal discharge dissipation through natural convection according to the present invention.

Using the illustrations in FIGS. 12 and 13, this natural compression and convection process can be explained another way. As shown, encasement module 10 comprises two primary volumes of air—a hot air volume and a cold air or room temperature volume. As processing components radiate heat from each opposing surface, the entire interior of encasement module 10 is heated. As such, most of the heat produced is directed towards the center of the encasement, and distributed as shown in FIG. 9. As heat from the processing components is generated, the particles of air in the lower volume of space as shown in FIGS. 12 and 13 are heated. As they are heated, they expand and increase in mass, thus creating a larger volume of particles in the lower half of encasement module 10. Because the volume in the lower portion of encasement module 10 is increased and is greater than the volume of particles in the upper portion, and as hot air naturally rises, the volume of air in the bottom gets accelerated as it moves to the top portion of the encasement. This is due to the concave structure and the fact that there is a smaller area of space at the middle of encasement module 10 for the air to pass through. Stated another way, because the volume of particles in the bottom is greater than at middle or the top, and because hot air rises, a greater volume of air particles is trying to go through a smaller space (the middle section) than the space it is currently present within. As this volume of heated air particles passes the middle portion of encasement module 10, where the concave wall supports provide a constricted space, a natural force is created that causes the heated volume of air to accelerate towards the top of the encasement, thus generating more volume of air particles in the top than were originally present. This force impacts the heated air particles and causes them to follow the path of least resistance, which is ultimately out ventilation ports 98 located at the top of end plates 38 and 42. The force generated at the middle portion of encasement module 10 does not have to be great. It just has to be enough to cause an acceleration of the heated air particles towards the top of encasement module 10. In fact, the force should be such that the heated air is not forced to conduct into the metal wall supports, or end plates, of encasement module 10. If the force is too great, the heated air particles will begin to conduct or transfer their energy to the wall supports. This is undesirable because the heat is essentially trapped in the encasement. By precisely calculating and providing the correct amount of force, once the volume in the top portion of the box is filled with heated air particles, these particles can be properly and naturally forced out of the encasement via convection with a reduced amount of conduction taking place. The path of least resistance is preserved by not forcing the heated air particles to transfer their energy into the structural components of encasement module 10. This process is designed to happen quickly to keep the flow of air moving.

The tri-board configuration 152 is designed so that the majority of generated heat is centrally located (see FIG. 9). The reason being, if most of the heat is centrally located, then the natural convection process described above will capture and drag or dissipate the majority of heat from the unit. In this way, a push-pull relationship is created. Air in the top of the case is pushed up and out of the encasement because of compression and the rising volume of heated air particles. On the other hand, as air is heated and its volume of particles rises, a void is left in the bottom half of encasement module 10 because these heated air particles are being dissipated. Thus, there becomes a need to replace the lost volume of air particles. As a result, ambient air is naturally pulled or sucked into the bottom of encasement module 10 at its lower half to replace the volume of air particles lost through convection. The two volumes are represented in FIGS. 12 and 13 and this push-pull relationship describes in simple terms the compression and natural convection enabled by the present invention and produces the circular air flow patterns shown in FIG. 11.

Another significant advantage worth mentioning is the fact that processing control unit 2 can be oriented on any side, on its ends, or in any other direction. The natural convection process is designed to function in any of these orientations.

It should be noted that the above description pertained to an exemplary embodiment. In other embodiments the path of heat dissipation using natural convection may change. Thus, the thermodynamic properties and natural convection that occurs in processing control unit 2 will be dictated by the particular design configuration of encasement module 10, as well as the particular printed circuit board design contained therein. For example, other designs are contemplated for processing control unit 2, wherein the natural convection properties of these alternative designs may be different than described above. This will be obvious and apparent to one of ordinary skill in the art.

In an alternative exemplary embodiment, the entire contents of encasement module 10 can be liquid cooled, using a cooling unit, by capping main support chassis with special end caps that will enclose the cooling unit and the cooling coil that will actually cool the liquid inside the chassis. In this embodiment, encasement module may be made out of any material, such as plastic or metal, with little or no effect upon the actual cooling of processing control unit 2. However, in a liquid cooled model, the encasement becomes important in the sense that the encasement serves to control the internal temperature of the encasement, much the same way skin helps to regulate the internal temperature of the body. In a metal liquid cooled design, once the encasement gets over a certain temperature, it's going to start radiating heat from a solid to a liquid back to a solid. Thus, even in a liquid cooled model, a metal encasement module is preferable.

Furthermore, in a liquid cooled processing control unit, the heat generated from the processing components contained therein is dissipated, and the processing components cooled, using a cooling unit, or a liquid cooling engine, and a cooling or refrigerant agent as commonly known in the art. The cooling unit preferably comprises a compressor, a condenser, and a series of heat-exchanging conduits or coils used to facilitate and direct the flow of the cooling agent through the processing control unit. Heat is dissipated, through absorption into the conduits, as the cooling agent is allowed to flow within the conduits.

In addition, in the liquid cooled model there is no requirement for a dust plate. The interior of the encasement may be entirely sealed off, thus completely prohibiting dust, debris, or other particles from entering. Such a sealed system lends itself to environments where sterility is crucial, such as a clean room, in addition to contributing to overall health.

In still another exemplary embodiment, the processing control unit may be cooled using a thermoelectric cooling system as commonly known in the art. According to known principles, thermoelectric cooling systems comprise solid state heat pumps that operate on the Peltier effect, which states that there is a heating or cooling effect when electric current passes through two conductors. In essence, a voltage applied to the free ends of two dissimilar materials creates a temperature difference, wherein the heat is caused to move from one end to the other. A typical thermoelectric cooler will consist of an array of semiconductor elements that act as the two dissimilar conductors. The array of elements is soldered, or otherwise attached, between two ceramic plates. These ceramic plates house the elements that exist electrically in series and thermally in parallel. To operate the cooling device, a DC current is induced and caused to pass through one or more pairs of elements. In doing so, there is a decrease in temperature at the junction, which is the cold side. This decrease in temperature results in heat absorption from the environment in which the device is placed.

In the present invention, a thermoelectric cooler device or system is placed within the interior of the encasement module of the processing control unit so that it draws heat from the interior and deposits the heat to the surrounding ambient air outside of the unit. If additional cooling is needed, a second or multiple thermoelectric coolers may be utilized for increased cooling effects.

The identified features, characteristics, functions, and advantages described herein are not meant to be limiting in any way. It is contemplated that one skilled in the art will recognize other apparent features and advantages to the present invention other than those specifically recited, described, or mentioned herein. Therefore, while the computer processing system or unit, with its proprietary design, is all specifically described, such descriptions are provided with the intention of encompassing like-systems or like-devices or like-methods that may or may not be obvious to one ordinarily skilled in the art.

The present invention may be embodied in other specific forms without departing from its spirit of essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. An encasement for a computer processing control unit comprising:
    a main support chassis having a plurality of wall supports and a plurality of junction centers containing means for supporting a computer component therein;
    a dynamic back plane that provides support for connecting peripheral and other computing components, wherein said dynamic back plane comprises a plurality of ports for connecting said peripheral devices and components; and
    means for cooling said encasement.

2. The encasement of claim 1, further comprising means for facilitating air flow in and out of said encasement.

3. The encasement of claim 2, further comprising first and second end plates removably coupled to said main support chassis and comprising a plurality of ventilation ports for facilitating the influx of air into and efflux of air out of said encasement, as well as to restrict partial flow of air into said encasement.

4. The encasement of claim 1, further comprising means for further enclosing said main support chassis to form an encasement.

5. The encasement of claim 4, wherein said means for enclosing said main support chassis comprises one or more end plates.

6. The encasement of claim 1, further comprising first, second, and third insert members that removably couple to said wall supports, said insert members providing both functional and aesthetic capabilities to said processing control unit.

7. The encasement of claim 6, wherein said insert members comprise a concave radius of curvature to match or mate with the curvature of said wall supports.

8. The encasement of claim 1, further comprising means for coupling or mounting external members to said encasement module, said means functioning to receive one of an insert member, a back plane, a side wall plane, a structure, an element of a structure, a device, another processing control unit, and/or a mounting bracket.

9. The encasement of claim 8, wherein said means for coupling comprises slide receivers formed on the outside of said junction centers of said main support chassis.

10. The encasement of claim 1, wherein said processing control unit comprises a non-peripherals-based design.

11. The encasement of claim 1, wherein said processing control unit comprises a load bearing design capable of receiving and supporting other structures, as well as functioning as a load bearing component within a structure.

12. The encasement of claim 1, wherein said encasement comprises an equivalent height, width, and depth, each that are less than 4 inches.

13. The encasement of claim 1, wherein said main support chassis and its component parts are designed entirely of curves comprising various calculated radii, said radius-based structure providing increased strength and load bearing characteristics to said encasement.

14. The encasement of claim 1, wherein said wall supports comprise a concave radius of curvature to provide structural, load bearing, heat dissipating, and other advantages and/or capabilities to said processing control unit.

15. The encasement of claim 1, wherein said processing control unit comprises a shape selected from the group consisting essentially of cubical, spherical, conical, triangular, rectangular, and any other conceivable shape capable of housing said processing components.

16. The encasement of claim 1, wherein said computer processing component comprises a multi-planar printed circuit board configuration.

17. The encasement of claim 1, wherein said means for supporting a computer component comprises a plurality of channeled board receivers formed within said junction centers.

18. The encasement of claim 1, wherein said means for supporting a computer component comprises one or more attachment means selected from the group consisting of screws, rivets, snaps, interference fits, snap-in fits, and others.

19. The encasement of claim 1, wherein said encasement is made from materials selected from the group consisting of steel, aluminum, titanium, hybrid metal alloys, copper, magnesium, and other metals and metal alloys; plastic, graphite, composites, nylon, and other non-metallic materials.

20. The encasement of claim 1, wherein said encasement is capable of withstanding and accepting both applied and impact forces.

21. The encasement of claim 1, wherein said encasement and its component parts are manufactured using one of an extrusion process, a die-casting process, an injection molding process, and others.

22. The encasement of claim 1, wherein said encasement is electrically charged to repel dust and debris, as well as to reduce the likelihood of a static charge from dust damaging said processing component.

23. The encasement of claim 1, further comprising an isolated power supply for concentrating the produced power to said processing component.

24. The encasement of claim 1, wherein said dynamic back plane comprises a universal port for process coupling two or more processing control units together.

25. The encasement of claim 1, wherein said dynamic back plane comprises a snap-on connection system for connecting peripheral devices, such that once snapped into place, said peripheral device is connected with the system bus of said processing control unit and is operational.

26. The encasement of claim 1, wherein a gap is created and maintained between said wall supports and said computer components as supported within said encasement so as to facilitate air flow between the two.

27. The encasement of claim 1, wherein said means for cooling is selected from the group consisting of a natural convection cooling system, a liquid cooling system, a forced air cooling system, a thermoelectric cooling system, and any combination of these.

28. A computer processing system comprising:
an encasement module comprising:
a main support chassis having a plurality of wall supports and a plurality of junction centers containing means for supporting a computer component therein;
a dynamic back plane that provides support for connecting peripheral and other computing components directly to a system bus without requiring an interface, said system bus operable with said computing components to connect various peripheral and other devices and to allow these devices to communicate with each other and said processing control unit; and
means for enclosing said main support chassis and providing access to an interior portion of said encasement module;
one or more computer processing components disposed within said junction centers of said encasement module; and
means for cooling said interior portion of said encasement module.

29. The computer processing system of claim 28, wherein said computer components comprise one or more electrical printed circuit boards.

30. The computer processing system of claim 29, wherein said electrical printed circuit boards are arranged in a layered configuration within said encasement module.

31. The computer processing system of claim 29, wherein said electrical printed circuit boards are arranged in a in-board configuration within said encasement module.

32. The computer processing system of claim 28, wherein said means for cooling said interior portion of said encasement module comprises a natural convection cooling system.

33. The computer processing system of claim 32, wherein said natural convection cooling system comprises:
a volume of air existing within said encasement module, said volume of air rising towards a top portion of said encasement module as heated;
means for naturally compressing said heated volume of air, said means comprising a constricted area of space within said encasement module that applies a force to said heated volume of air, thus increasing its upward velocity and forcing it out said encasement module, while simultaneously facilitating a recurring influx of ambient air to replace said heated volume of air purged from said encasement module, such that a natural cycle of air flow is created.

34. The computer processing system of claim 33, wherein said means for naturally compressing said heated volume of air comprises a series of concave wall supports, such that said air is compressed between said wall supports and said processing components.

35. The computer processing system of claim 28, further comprising means for coupling and supporting an external member.

36. The computer processing system of claim 35, wherein said means for coupling and supporting an external member comprises socketed rail receivers formed into said main support chassis, said means capable of removably engaging and coupling one of an external mounting member, an insert member, a structure, a device, a system, and a host structure.

37. The computer processing system of claim 35, wherein said processing control unit utilizes said means for coupling and supporting an external member to be mounted and functional within any type of conceivable device, assembly, system, and environment to transform each of these into one of a smart device, a smart system, a smart assembly, and a smart environment.

38. The computer processing system of claim 28, further comprising a power system that is activated upon insertion of a power cord.

39. The computer processing system of claim 38, wherein said power cord further comprises a clip coupled thereto that comprises leads that must make connect with one or more contacts in said processing control unit for the system to power up.

40. The computer processing system of claim 28, wherein said encasement module is a load bearing structure capable of receiving and supporting other structures, as well as functioning as a load bearing component within a structure.

41. The computer processing system of claim 28, wherein said encasement is substantially cubical in shape and comprises an equivalent height, length, and depth, each less than 4 inches.

42. The computer processing system of claim 28, wherein said encasement comprises:
a main support chassis having first, second and third concave side wall supports integrally connected with one or more junction centers;
first and second end plates removably coupled to said main support chassis and comprising a plurality of ventilation ports for allowing an influx of air into and an efflux of air out of said encasement module;
a dynamic back plane removably coupled to said main support chassis, said dynamic back plane comprising various ports for connecting peripheral computing components;
insert members removably coupled to said wall supports of said main support chassis; and
means for removably securing a multi-planar computer processing component within said encasement module.

43. The computer processing system of claim 28, wherein said means for cooling said interior portion of said encasement module comprises a liquid cooling system.

44. The computer processing system of claim 28, wherein said means for cooling said interior portion of said encasement module comprises a forced air cooling system.

45. The computer processing system of claim 28, wherein said means for cooling said interior portion of said encasement module comprises a heat conduction system, wherein at least a portion of said processing control unit is formed of a heat conducting material.

46. The computer processing system of claim 28, wherein said means for cooling said interior portion of said encasement module comprises thermoelectric cooling system.

47. The computer processing system of claim 28, wherein said processing control unit comprises no peripheral computing components, just computer processing components.

48. The computer processing system of claim 28, further comprising at least one peripheral computing component.

49. The computer processing system of claim 28, wherein said dynamic back plane comprises a universal port for process coupling another processing control unit.

50. The computer processing system of claim 28, further comprising means for scaling the processing power of said processing control system, said means comprising process coupling two or more said processing control units together.

51. The computer processing system of claim 28, wherein said processing system reduces radiation contributing to electromagnetic interference.

52. The computer processing system of claim 28, further comprising one or more input/output interfaces for connecting various hardware and peripheral components.

53. The computer processing system of claim 28, further comprising an increased durability factor due to the design of said processing control unit.

54. A system for dissipating heat from the interior of an encasement module of a processing control unit using natural convection, said system comprising:
a main support chassis having a plurality of support walls to form an encasement module;
one or more computer components removably supported within said encasement module to form a processing control unit, said computer component generating thermal discharge, thus heating the surrounding air; and
ventilation ports of sufficient size formed at least at perimeter regions of said encasement module to only allow the passage of air into and out of the interior of said encasement module,
said encasement module comprising a design capable of inducing natural, non-mechanically-forced airflow in and out of said ventilation ports.

55. The system of claim 54, wherein said encasement module comprises means for compressing and transferring said heated air particles, said means inducing a natural force on said heated air particles, thus increasing their velocity and causing them to exit said encasement module through said upper ventilation ports, said means for compressing further facilitating a recurring influx of ambient air through said lower ventilation ports to replace the volume of air particles purged from said encasement module, such that a natural cycle of air flow is created within said processing control unit, said natural cycle of air flow dissipating said thermal discharge from said processing control unit, thus cooling said processing control unit.

56. The system of claim 55, wherein said means for compressing and transferring comprises at least one of said support walls having a concave shape and positioned a distance from said computer component to create a gap, such that said gap comprises a nozzle-like shape to facilitate airflow and to direct said heated air particles away from said computer component and toward the corners of said processing control unit.

57. The system of claim 54, wherein said heated air is caused to flow out of said encasement while cooler ambient air is caused to be pulled into said encasement.

58. The system of claim 54, wherein said encasement module is comprised at least in part of a heat conducting material that functions to dissipate heat from the interior of said processing control unit by natural conduction.

59. The system of claim 54, wherein said encasement module is designed to cause airflow to begin shortly after initial thermal discharge from said computer component, such that the temperature of said heated air particles exiting said encasement module is substantially the same, or between 1 and 10 degrees, as the temperature of ambient air particles entering said encasement, thus said heated air particles having a negligible overall effect on the ambient temperature.

60. The system of claim 54, wherein said encasement module comprises an enclosure boundary or enclosure volume that is smaller than the volume of air particles heated by the thermal radiation output by said computer component, thus facilitating continuous air flow out of said ventilation ports and eliminating the trapping of air particles within said interior of said encasement.

61. The system of claim 54, wherein said processing control unit may be oriented in any or changing orientations without effecting its heat dissipating capabilities.

62. A method for naturally dissipating heat from the interior portion of a computer encasement via natural convection, said method comprising the steps of:
  obtaining a processing control unit comprising:
    a main support chassis having a plurality of curved support walls and coverings to form an encasement module;
    one or more computer components removably supported within said encasement module, said computer components generating thermal discharge, thus heating surrounding air particles within the interior of said encasement module; and
    ventilation ports of sufficient size formed at least at upper and lower regions of said encasement module to only allow the passage of air particles into and out of said interior of said encasement module;
  powering on said processing control unit to allow said computer components contained therein to become operational, wherein said computer component generates thermal discharge in the form of heated air particles, thus inducing natural, non-mechanically-forced airflow in and out of said ventilation ports of said processing control unit.

63. The method of claim 62, wherein said encasement module further comprises:
  a volume of air particles existing within a bottom portion of said encasement module;
  a volume of air particles existing at a top portion of said encasement module, said air particles rising towards a top portion of said encasement module as heated;
  means for naturally compressing said heated air particles comprising a constricted area of space within said encasement module that applies a force to said volume of heated air particles, thus increasing its upward velocity and forcing it out said encasement module, while simultaneously facilitating a recurring influx of ambient air to replace the volume of air particles purged from said encasement module, such that a natural cycle of air flow is created within said processing control unit, said natural cycle of air flow cooling said processing control unit.

64. The method of claim 63, wherein said means for naturally compressing said heated air particles comprises at least one of said support walls having a concave shape and positioned a distance from said computer component to create a gap, such that said gap comprises a nozzle-like shape to facilitate airflow and to direct said heated air particles away from said computer component and toward the corners of said processing control unit.

65. The method of claim 62, wherein said encasement module comprises an enclosure boundary or enclosure volume that is smaller than the volume of air particles heated by the thermal radiation output by said computer component, thus facilitating continuous air flow out of said ventilation ports and eliminating the trapping of air particles within said interior of said encasement.

66. The method of claim 62, further comprising the step of manufacturing at least a portion of said encasement module from heat conducting material to facilitate dissipation of heat by natural conduction as said heat particles are caused to contact said heat conducting material.

* * * * *